US009484765B2

(12) United States Patent
Kim

(10) Patent No.: US 9,484,765 B2
(45) Date of Patent: Nov. 1, 2016

(54) CHARGING DEVICE AND OPERATING METHOD THEREOF

(71) Applicant: Samsung Electronics Co., Ltd., Gyeonggi-do (KR)

(72) Inventor: Soo-Hyung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 173 days.

(21) Appl. No.: 14/309,791

(22) Filed: Jun. 19, 2014

(65) Prior Publication Data

US 2014/0375278 A1 Dec. 25, 2014

(30) Foreign Application Priority Data

Jun. 19, 2013 (KR) ........................ 10-2013-0070381

(51) Int. Cl.
*H02J 7/00* (2006.01)
*H02J 7/02* (2016.01)
*H02J 7/04* (2006.01)

(52) U.S. Cl.
CPC .............. *H02J 7/007* (2013.01); *H02J 7/022* (2013.01); *H02J 7/04* (2013.01); *H02J 7/041* (2013.01); *H02J 7/045* (2013.01); *H02J 7/0068* (2013.01); *H02J 2007/0059* (2013.01)

(58) Field of Classification Search
CPC .. H02J 2007/0059; H02J 7/007; H02J 7/022; H02J 7/04
USPC ........................................ 320/137, 155, 160
See application file for complete search history.

(56) References Cited

U.S. PATENT DOCUMENTS 5,563,493 A 10/1996 Matsuda et al.
6,005,368 A * 12/1999 Frame .................. G06F 1/1632
                                                    307/53
6,240,297 B1 * 5/2001 Jadoul .................. H02J 7/0027
                                                    455/463
6,509,717 B2 * 1/2003 Lee ....................... G06F 1/1632
                                                    320/116
6,888,338 B1 * 5/2005 Popescu-Stanesti .... G06F 1/263
                                                    320/137
7,123,475 B2 * 10/2006 Park ..................... G06F 1/1632
                                                    361/679.41
7,952,328 B2   5/2011 Parker et al.
8,035,342 B2  10/2011 Chai et al.
8,063,610 B2  11/2011 Chavakula
8,072,183 B2  12/2011 Griffin, Jr.

(Continued)

FOREIGN PATENT DOCUMENTS

JP  2012-228034 A  11/2012

OTHER PUBLICATIONS

International Search Report dated Oct. 2, 2014 in connection with International Application No. PCT/KR2014/005422; 3 pages.
Written Opinion of International Searching Authority dated Oct. 2, 2014 in connection with international Application No. PCT/KR2014/005422; 5 pages.

(Continued)

*Primary Examiner* — Sun Lin

(57) ABSTRACT

An electronic device having a charging function is provided. The electronic device includes a conversion unit for converting an Alternating Current (AC) voltage to a Direct Current (DC), a first charging unit for generating a first charging voltage or current using the DC voltage, and an output unit for providing the DC voltage and the first charging voltage or current to an external device. Various other implementations are possible.

41 Claims, 15 Drawing Sheets

(56) References Cited

U.S. PATENT DOCUMENTS

| | | |
|---|---|---|
| 8,107,243 B2 | 1/2012 | Guccione et al. |
| 8,169,187 B2 | 5/2012 | Fischer et al. |
| 8,248,032 B2 * | 8/2012 | Ozeki .................. H02J 7/0018 320/124 |
| 2007/0126401 A1 | 6/2007 | Chen et al. |
| 2008/0252256 A1 | 10/2008 | Parker et al. |
| 2010/0067197 A1 | 3/2010 | Guccione et al. |
| 2010/0231165 A1 | 9/2010 | Griffin, Jr. |
| 2011/0109261 A1 | 5/2011 | Chavakula |
| 2011/0285346 A1 | 11/2011 | Fischer et al. |

OTHER PUBLICATIONS

Patent Examination Report No. 1 dated May 11, 2016 in connection with Australian Patent Appl. No. 2014281933; 2 pages.

* cited by examiner

| CONNECTION \ ELECTRONIC DEVICE | CHARGING UNIT OF USER DEVICE | CHARGING UNIT OF ADAPTER | CHARGING UNIT OF DOCK |
|---|---|---|---|
| USER DEVICE AND ADAPTER | 1 | 2 | . |
| | 2 | 1 | . |
| USER DEVICE, ADAPTER, AND DOCK | 1 | 2 | 3 |
| | 1 | 3 | 2 |
| | 2 | 1 | 3 |
| | 2 | 3 | 1 |
| | 3 | 1 | 2 |
| | 3 | 2 | 1 |

FIG.14

CHARGING DEVICE AND OPERATING METHOD THEREOF

PRIORITY

The present application is related to and claims the benefit under 35 U.S.C. §119(a) of a Korean patent application filed in the Korean Intellectual Property Office on Jun. 19, 2013 and assigned Serial No. 10-2013-0070381, the entire disclosure of which is hereby incorporated by reference.

TECHNICAL FILED

The present disclosure relate to a charging device and operating method thereof.

BACKGROUND

With the development of electronics communication industries in recent years, an electronic device such as a cellular phone, an electronics organizer, a Personal Digital Assistant (PDA), etc., has become necessities of modern life as an important means for delivering information which changes rapidly.

There is a growing user's demand for the electronic device as the electronic device is popularized. The electronic device uses a battery as a power source, and a battery consumption amount is increased since the introduction of a smart electronic device causes an increase in the use of the Internet, applications, etc., a display size is increased, and a Central Processing Unit (CPU) is improved in its resolution and performance. A high capacity battery is produced to cope with such a situation, and there is a growing interest on quick charging of the high capacity battery.

A charging unit is included inside an electronic device. The charging unit included inside the electronic device receives a Direct Current (DC) voltage or power from an external device (e.g., an adapter), and provides a charging voltage or a charging current in accordance with the power of the external device. For example, the charging unit included inside the electronic device may regulate the charging voltage to a constant voltage, and may charge a battery with a pre-set or specified charging current. Although a high charging current is required for the quick charging of the high capacity battery described above, there is a limitation in the increase in the charging current or the charging voltage of the charging unit due to an internal heating problem or the like caused by the high charging current. Accordingly, a charging time is inevitably increased when the high capacity battery is charged using the charging unit included inside the electronic device.

SUMMARY

To address the above-discussed deficiencies, it is a primary object to decrease a charging time of a battery of an electronic device in such a manner that the battery included inside the electronic device is charged using not only a charging unit included inside the electronic device but also a charging unit included inside at least one external device.

Another aspect of the present disclosure is to avoid overheating of each charging unit and to achieve quick charging in such a manner that a charging current suitable for battery charging of an electronic device is processed in a distributed manner in a charging unit included inside the electronic device and a charging unit included inside at least one external device.

Another aspect of the present disclosure is to provide an adapter for down-converting an Alternating Current (AC) power to a Direct Current (DC) voltage. The adapter may include at least one internal charging unit for outputting a charging voltage or charging current capable of charging a battery of an electronic device from the DC voltage or DC current, and an output unit for providing the DC voltage and the charging current or charging voltage to a dock or an electronic device.

Another aspect of the present disclosure is to provide a dock capable of holding an electronic device. The dock may include at least one charging unit for outputting a charging voltage and charging current capable of charging a battery of an electronic device from a DC voltage provided from an adapter, and an output unit for providing the DC voltage and charging current or charging voltage provided from the adapter to the dock or the electronic device.

In accordance with an aspect of the present disclosure, an electronic device includes a conversion unit configured to convert an Alternating Current (AC) voltage to a Direct Current (DC) voltage; a first charging unit configured to generate a first charging voltage or current using the DC voltage; and an output unit to provide the DC voltage and the first charging voltage or current to an external device.

In accordance with another aspect of the present disclosure, a second electronic device to electrically couple between a first electronic device having a charging function and a third electronic device having a charging function is provided. The second electronic device includes an input unit configured to receive a Direct Current (DC) voltage and a first charging voltage or current from the first electronic device; a second charging unit configured to generate a second charging voltage or current to charge a battery using the DC voltage; and an output unit to provide the DC voltage, and at least one of the first charging voltage or current and the second charging voltage or current to the third electronic device.

In accordance with another aspect of the present disclosure, a third electronic device includes an input unit configured to receive at least one of a Direct Current power and a first charging voltage or current from a first electronic device and a Direct Current power and a second charging voltage or current from a second electronic device; at least one third charging unit configured to generate at least one third charging voltage or current for charging an internal battery using the DC voltage; and a battery configured to be charged by the at least one of the first charging voltage or current, the second charging voltage or current, and the at least one third charging voltage or current.

In accordance with another aspect of the present disclosure, an electronic device includes a battery configured to supply a first DC voltage or current; a conversion unit configured to convert the first DC voltage or current to a second DC voltage or current; a first charging unit configured to generate a first charging voltage or current using the second DC voltage or current; and an output unit to provide the second DC voltage or current and the first DC voltage or current.

In accordance with an aspect of the present disclosure, an method of operating an electronic device having a charging function is provided. The method includes converting an Alternating Current voltage to a Direct Current voltage; generating a first charging voltage or current using the DC voltage; and providing the DC voltage and the first charging voltage or current to an external device.

In accordance with another aspect of the present disclosure, a method of operating a second electronic device to electrically couple between a first electronic device having a charging function and a third electronic device having a charging function is provided. the method includes receiving a Direct Current voltage and a first charging voltage or current from the first electronic device; generating a second charging voltage or current to change a battery using the DC voltage; and providing the DC voltage, and at least one of the first charging voltage or current and the second charging voltage or current to the third electronic device.

In accordance with an aspect of the present disclosure, a method of operating a third electronic device having a charging function is provided. The method includes receiving at least one of i) a Direct Current power and a first charging voltage or current from a first electronic device, and ii) a Direct Current power and a second charging voltage or current from a second electronic device; generating at least one third charging voltage or current for charging an internal battery using the DC voltage; and charging a battery using the first charging voltage or current, the second charging voltage or current, and the at least one third charging voltage or current.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 is a table illustrating an operation order of charging units in a state where a third electronic device, a first electronic device, and a second electronic device are connected according to various exemplary embodiments of the present disclosure.

DETAILED DESCRIPTION

Figure 1:
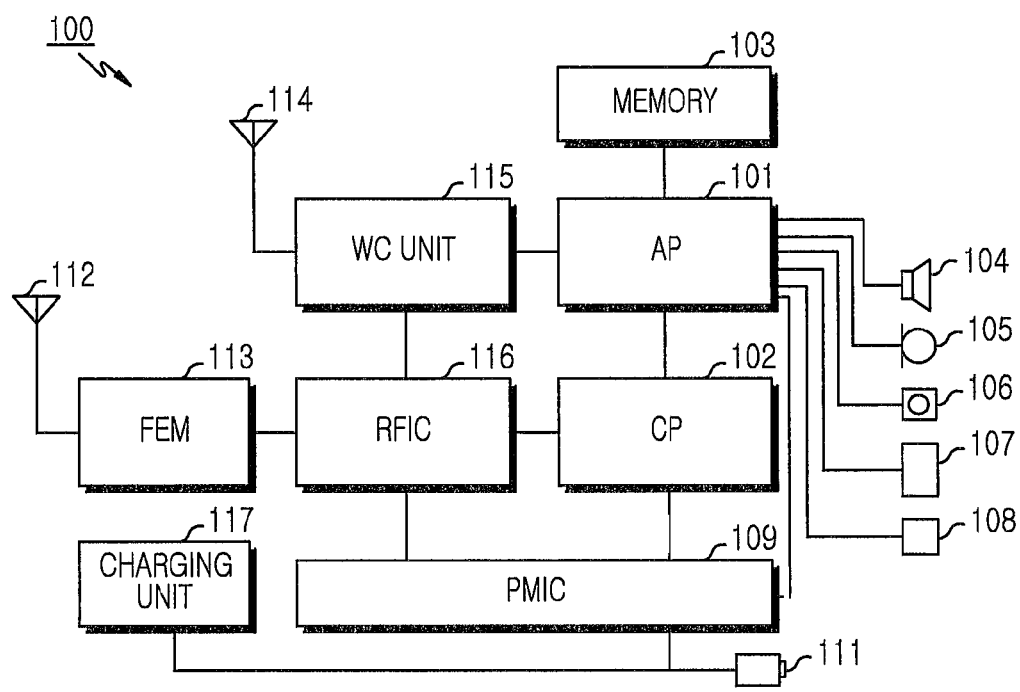
FIG. 1 is a block diagram of an electronic device according to various exemplary embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. While the present disclosure is susceptible to various modifications and alternative forms, a specific embodiment thereof has been shown by way of example in the drawings and will herein be described in detail. It should be understood, however, that it is not intended to limit the disclosure to the particular form disclosed, but, on the contrary, the intention is to cover all modifications, equivalent, and alternatives falling within the spirit and scope of the disclosure as defined by the appended claims.

FIG. 1 is a block diagram of an electronic device according to various exemplary embodiments of the present disclosure.

A third electronic device 100 may be a device such as a mobile phone, a mobile pad, a media player, a tablet computer, a hand-held computer, or a Personal Digital Assistance (PDA). The electronic device may be any electronic device including a device which combines two or more functions of the aforementioned devices.

Referring to FIG. 1, the third electronic device 100 may include an Application Processor (AP) 101, a Communication Processor (CP) 102, a memory 103, a speaker 104, a microphone 105, a camera 106, a display 107, a touch panel 108, a Power Manager integrated Circuit (PMIC) 109, a battery 111, a cellular antenna 112, a Front End Module (FEM) 113, a Wireless Connectivity (WC) antenna 114, a WC unit 115, a Radio Frequency Integrated Circuit (WIC) 116, and a charging unit 117.

The AP 101 performs an overall role of the third electronic device 100, and may support an arithmetic processing function, a contents reproduction function of various formats (e.g., an audio, image, video, or the like), a graphic engine, etc. The AP 101 may drive an Operating System (OS), various functions, etc., applied to the third electronic device 100. The AP 101 may be constructed with one chip on which a great number of functions are integrated. The functions may be a core, a memory, a display system/controller, a multimedia encoding/decoding codec, a 2 Dimensional (D)/3D accelerator engine, an Image Signal Processor (ISP), a camera, an audio modem, a variety of high & low speed serial/parallel connectivity interface, etc. The AP 101 drives the OS and applications, and may be called a System-On-Chip (SOC) on which a function of controlling various system devices/interfaces is integrated into one chip.

The CP 102 enables voice communication and/or data communication, and may compress voice data and image data or may decompress the compressed data. The CP 102 may be a baseband modem, a Baseband Processor (BP), or the like. The CP 102 may be designed to operate using one of a Global System for Mobile Communication (GSM) network, an Enhanced Data GSM Environment (EDGE) network, a Code Division Multiple Access (CDMA) network, a W-Code Division Multiple Access (W-CDMA) network, a Long Term Evolution (LTE) network, an Orthogonal Frequency Division Multiple Access (OFDMA) network, a Wireless Fidelity (Wi-Fi) network, a WiMax network, and a Bluetooth network.

Although not shown, the third electronic device 100 may include a graphic processor or an audio processor. The graphic processor processes a graphic-related operation, and may serve for image information processing, acceleration, signal conversion, screen output, etc. The graphic processor may solve a bottleneck phenomenon generated due to a graphic task of the AP 101, and may perform 2D or 3D graphic processing faster than the AP 101. The audio processor processes an audio-related operation, and may change an audio signal having a digital or analog format using an audio effect or an effect unit.

The memory 103 may store a software-related program (i.e., an instruction set) executable by the aforementioned processors. The memory 103 may include a fast random access memory such as one or more magnetic disc storage devices and/or a non-volatile memory, one or more optical storage devices, and/or a flash memory (e.g., NAND, NOR). A software component may include an operating system program, a communication program, a camera program, a graphic program, one or more application programs, a user interface program, a codec program, etc. The terminology of "program" is also expressed as a set of instructions or an instruction set or a program. The communication program, the camera program, the graphic program, the one or more application programs, the user interface program, and the codec program may be used through various Application Programming Interfaces (APIs) when the operating system program performs various functions. In addition to the aforementioned programs, the memory 103 may further include an additional program (instructions).

The speaker 104 may convert an electric signal into a sound of an audible frequency band and then may output the converted signal. The microphone 105 may convert a sound wave delivered from human or other sound sources into an electric signal.

The camera 106 may convert a light beam reflected from a subject of photography into an electric signal. The camera 106 may include a Charged Coupled Device (CCD), a Complementary Metal-Oxide Semiconductor (CMOS), etc.

The display 107 may output an electric signal as visual information (e.g., text, graphic, video, etc.). The display 107 may be one of an Electro Wetting Display (EWD), an E-Paper, a Plasma Display Panel (PDP), a Liquid Crystal Display (LCD), an Organic Light Emitting Diode (OLED), and an Active Matrix Organic Light Emitting Diodes (AMOLED).

The touch panel 108 may receive a touch input. The touch panel may be one of a digitizer for a stylus pen, a capacitive overlap touch panel, a resistance overlap touch panel, a surface acoustic wave touch panel, and an infrared beam touch panel.

The PMIC 109 may regulate a power from the battery 111. For example, the AP 101 may transmit information to the PMIC 109 with a load to be processed. The PMIC 109 may regulate a core voltage to be supplied to the AP 101 using the information provided from the AP 101, and may drive the AP 101 with a minimum power.

The FEM 113 may be a transmission/reception device capable of controlling a radio signal. The FEM 113 may connect the cellular antenna 112 and the RFIC 116, and may separate a transmission/reception signal. The FEM 113 may take a role of filtering and amplification, and may include a receiving-side front end module including a filter for filtering a reception signal and a transmitting-side front end module including a Power Amplifier Module (PAM) for amplifying a transmission signal.

The WC unit 115 may be implemented by including various communication functions not processed by the processors 101 and 102, for example, WiFi, Bluetooth, Near Field Communication (NFC), Universal Serial Bus (USB), or Global Positioning System (GPS).

The RFIC (e.g., RF transceiver) 116 may receive a radio frequency from a base station, and may modulate a received high frequency band into a low frequency band (i.e., a baseband) that may be processed in a module (e.g., the CP 102). For transmission of the base station, the RFIC 116 may modulate the low frequency processed in the module into a high frequency.

The charging unit 117 may charge the battery 111. The charging unit 117 may generate a charge voltage and charge current required for battery charging from a Direct Current (DC) voltage received from an external element, and may charge the battery 111 using the generated charge voltage and charging current. The charging unit 117 may charge the battery 111 using at least one of the charge voltage and charging current received from the external element (e.g., an adapter or a dock). According to various exemplary embodiments, the at least one charging voltage and charging current received from the external device may be provided directly to the battery 111 through another connecting part or line or passage, not via the charging unit 117. For example, the at least one charging voltage and charging current received from the external device may be provided to the battery 111 through a direct connecting part or line or passage between a device socket connector for connecting the external device and the electronic device and the battery 111 included inside the electronic device.

The charging unit 117 may decrease a DC voltage (i.e., 5V) supplied from the external device to a charging voltage (i.e., 4.2V) for charging. The battery 111 may be safe if charged with a charging voltage not exceeding an allowable voltage. The battery 111 may be safe if charged with a charging current not exceeding an allowable current. If the battery 111 is charged with a charging voltage higher than the allowable voltage, the battery 111 may be exploded. If the battery 111 is charged with a charging current higher than the allowable current, the battery 111 may be heated. The charging unit 117 may regulate the charging voltage to a constant voltage, and may avoid the explosion of the battery 111. The charging voltage from the charging unit 117 of the third electronic device 100 and a charging voltage from the charging unit of the external device may satisfy a voltage allowed to charge the battery 111, and the battery 111 may be avoided from explosion. The charging current from the charging unit 117 of the third electronic device 100 and a charging current from a charging unit of the external device may satisfy a current allowed to charge the battery 111, and the battery 111 may be avoided from heating. The charging unit 117 may regulate a level of the charging current by considering a level of the charging current from the charging unit of the external device. The charging unit 117 may perform a constant current charging operation and a constant voltage charging operation when charging the battery 111. The charging unit 117 may proceed to a constant current charging operation for charging the battery 111 with a constant current, and may increase a voltage of the battery 111. When the voltage of the battery 111 reaches a full voltage (e.g., 4.2V), the charging unit 117 may transition to a constant voltage charging operation for charging the battery 111 with a charging voltage (i.e., 4.2V). The charging unit 117 decreases the charging current to the battery 111 according to a time while performing the constant voltage charging operation, and may recognize that the charging of the battery 111 is complete when the charging current reaches a cutoff current. The charging unit of the external device may also perform such a constant current charging operation and a constant voltage charging operation. The charging unit 117 may include an external port electrically connectable to the external device (e.g., an adapter, dock, etc.). The external port may be a male connector (e.g., a plug) or a female connector.

Although only one charging unit 117 is illustrated in FIG. 1, according to various exemplary embodiments, the electronic device may include a plurality of charging units by combining wired charging units and wireless charging units. Regarding the charging unit, a plurality of charging units may be constructed using a linear charger or using a switching charger or by combining the linear charger and the switching charger. The linear charger is constructed with a simple circuit, and does not use high frequency switching. Therefore, even if reliable power is supplied, efficiency may deteriorate. The aforementioned switching charger charges a voltage and a current through regulation by switching a rectified DC current at a high speed. The switching charger may have higher efficiency than the linear charger since the current or the voltage is regulated using high-speed switching.

In various exemplary embodiments of the present disclosure described hereinafter, a first electronic device 20 may be a charging adapter electrically connected to the third electronic device 100 or an external charging electronic device, and second electronic devices 40 and 60 may be a dock capable of holding the third electronic device 100.

Figure 2A:
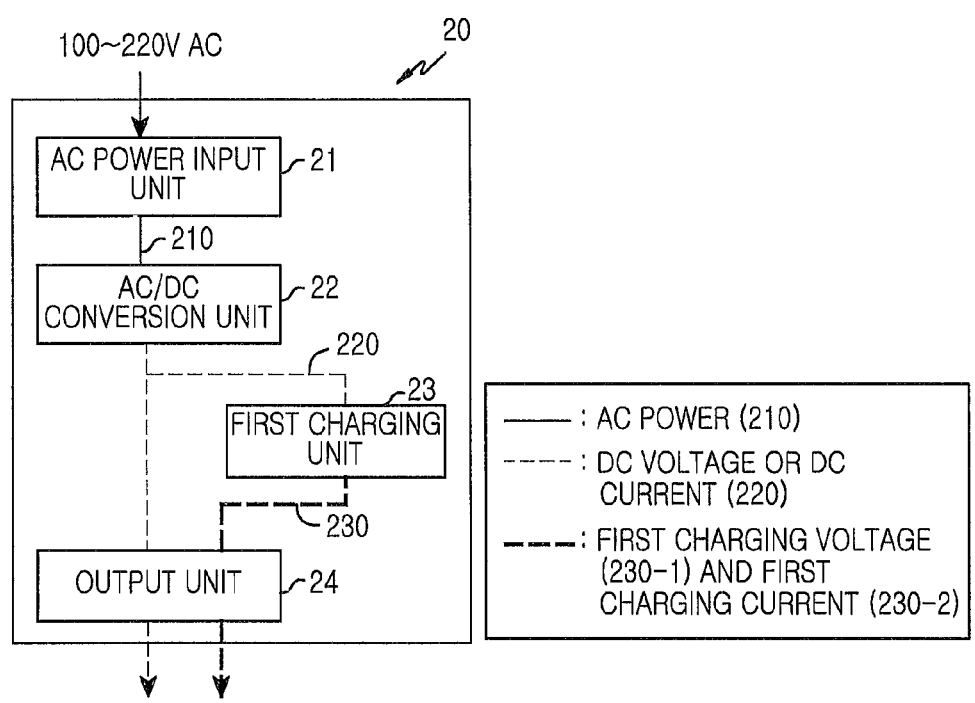
FIG. 2A and FIG. 2B are block diagrams of a first electronic device according to various exemplary embodiments of the present disclosure.
Figure 2B:
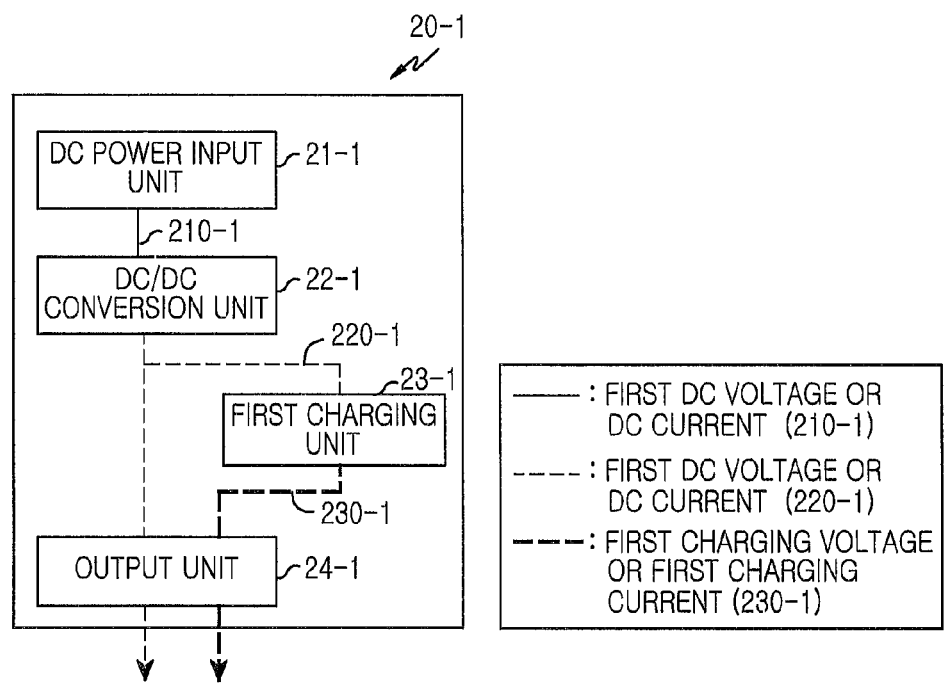

FIG. 2A and FIG. 2B are block diagrams of a first electronic device according to various exemplary embodiments of the present disclosure.

Referring to FIG. 2A, a first charging electronic device 20 may include an AC power input unit 21, an AC/DC conversion unit 22, a first charging unit 23, and an output unit 24.

The AC power input unit 21 may receive an AC power 210 of 100 to 220 V. The AC power input unit 21 may include a plug. If a user inserts the plug of the first electronic device 20 to a plug socket or other AC power source installed in home, the AC power input unit 21 may receive the AC power 210. The AC power input unit 21 may output the AC power 210 received through a connecting part or line with the AC/DC conversion unit 22.

The AC/DC conversion unit 22, or simply the AC/DC converter, may receive the AC power 210 through the connecting part or line with the AC power input unit 21. The AC/DC conversion unit 22 may down-convert the AC power 210 to a DC voltage 220. The AC/DC conversion unit 22 may provide the down-converted DC voltage 220 to the first charging unit 23 and the output unit 24 through the connecting part or line. The charging unit 23 may receive the DC voltage 220 through a connecting part or line with the AC/DC conversion unit 22. The first charging unit 23, or simply the first charger, may generate a first charging voltage 230-1 or first charging current 230-2 capable of charging the battery 111 of the third electronic device 110 from the received DC voltage or DC current 220, and may output the generated first charging voltage 230-1 or first charging current 230-2 through a connecting part or line with the output unit 24. The first charging unit 23 may regulate a level of the first charging current 230-2 by considering a level of a charging current of at least one charging unit included in at least one device (e.g., the electronic device 100 or the dock 30) connected to the first charging electronic device 20. The first charging voltage 230-1 may be a voltage allowed to charge the battery 111.

The output unit 24 may output the DC voltage 220 received through a connecting part or line with the AC/DC conversion unit 22. The output unit 24 may provide the first charging voltage 230-1 or first charging current 230-2 received through the connecting part or line with the first charging unit 23 to the external device (e.g., the electronic device or the dock). The output unit 24 may include a male connector (plug) or female connector electrically connectable to the external port of the third electronic device 100 or a connector of a dock 60 of FIG. 6. The output unit 24 may include a male connector (plug) or female connector electrically connectable to a connector of a cable. The output unit 24 may include a cable constituting a male connector (plug) or a female connector at an end portion. Meanwhile, the male connector or female connector of the output unit 24 may include a plurality of nodes. Any one of the plurality of nodes may output the DC voltage or DC current 220 from the AC/DC conversion unit 22. Any one of the plurality of nodes may output the first charging voltage or charging current 230 from the first charging unit 23.

Referring to FIG. 2B, an external charging electronic device 20-1 may include a DC power input unit 21-1, a DC/DC conversion unit 22-1, a first charging unit 23-1, and an output unit 24-1.

The DC power input unit 21-1 may be electrically connected to a DC power source (e.g., a battery, an external DC power input, etc.) (hereinafter, called a first DC power 210-1). For example, at least one of a battery and an external DC power may be provided to the DC power input unit 21-1. The DC/DC conversion unit 22-1, or simply the DC/DC converter, may receive the first DC power 210-1 through a connecting part or line with the DC power input unit 21-1. The DC/DC conversion unit 22-1 may convert the first DC power 210-1 into a second DC voltage or current 220-1. In this case, the first DC power 210-1 may be higher or lower than the second DC voltage. The DC/DC conversion unit 22-1 may provide the converted second DC voltage 220-1 to the first charging unit 23-1 and the output unit 24-1 through the connecting part or line. The first charging unit 23-1, or simply the first charger, may receive the second DC voltage 220-1 through a connecting part or line with the DC/DC conversion unit 22-1. The first charging unit 23-1 may generate a first charging voltage or first charging current 230-1 capable of charging the battery 111 of the third electronic device 110 from the received second DC voltage or DC current 220-1, and may output the generated first charging voltage or first charging current 230-1 through a connecting part or line with the output unit 24-1. The first charging unit 23-1 may regulate a level of the first charging current 230-1 by considering a level of a charging current of at least one charging unit included in at least one device (e.g., the electronic device 100 or the dock 30) connected to the external charging electronic device 20-1. The first charging voltage 230-1 may be a voltage allowed to charge the battery 111.

The output unit 24-1 may output the first DC voltage 220-1 received through a connecting part or line with the DC/DC conversion unit 22-1. The output unit 24-1 may provide the first charging voltage or first charging current 230-1 received through the connecting part or line with the first charging unit 23-1 to the external device (e.g., the electronic device or the dock). The output unit 24-1 may include a male connector (plug) or female connector electrically connectable to the external port of the third electronic device 100 or a connector of a dock 60 of FIG. 6. The output unit 24-1 may include a male connector (plug) or female connector electrically connectable to a connector of a cable. The output unit 24-1 may include a cable constituting a male connector (plug) or a female connector at an end portion. Meanwhile, the male connector or female connector of the output unit 24-1 may include a plurality of nodes. Any one of the plurality of nodes may output the first DC voltage or DC current 220-1 from the DC/DC conversion unit 22-1. Any one of the plurality of nodes may output the first charging voltage or charging current 230-1 from the first charging unit 23-1.

Although only one first charging unit is illustrated in FIG. 2A and FIG. 2B, according to various exemplary embodiments, a plurality of charging units may be provided by combining wired charging Units and wireless charging units. The plurality of charging units may be constructed using a linear charger. The plurality of charging units may be constructed using a switching charger. The plurality of charging units may be constructed by combining the linear charger and the switching charger.

Figure 3:
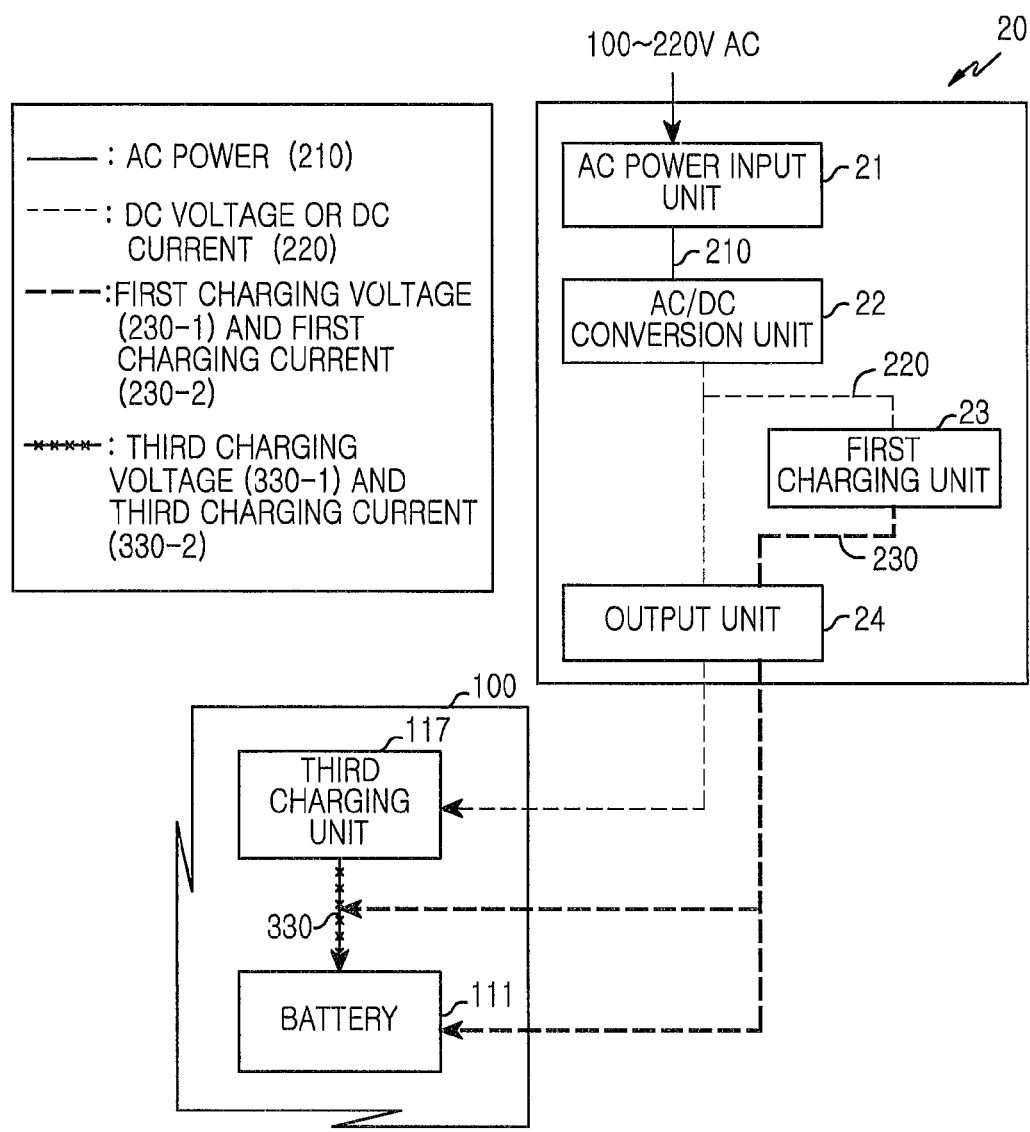
FIG. 3 illustrates a connection between a third electronic device and a first electronic device according to various exemplary embodiments of the present disclosure.

FIG. 3 illustrates a connection between a third electronic device and a first electronic device according to various exemplary embodiments of the present disclosure.

Referring to FIG. 3, the first electronic device 20 of FIG. 2A may include an AC power input unit 21, an AC/DC conversion unit 22, a first charging unit 23, and an output unit 24. The AC power input unit 21 may be connected to an AC power source and may receive an AC power 210. The AC power input unit 21 may output the AC power 210 received through a connecting part or line with the AC/DC conversion unit 22. The AC/DC conversion unit 22 may convert the AC power 210 received from the AC power input unit 21 into a DC voltage 220. The AC/DC conversion unit 22 may provide the converted DC voltage 220 to the charging unit 23 and the output unit 24. The first charging unit 23 may generate a first charging voltage 230-4 or first charging current 230-2 for charging a battery 111 of a third electronic device 100 using the DC voltage 220 received from the AC/DC conversion unit 22, and may provide the generated first charging voltage 230-1 or first charging current 230-2 to the output unit 24. The first charging unit 23 may regulate a level of the first charging current 230-2 by considering a level of a third charging current 330-2 charged by a third charging unit 117 of the third electronic device 100. A sum of the first charging current 230-2 of the first electronic device 20 and the third charging current 330-2 of the third electronic device 100 may not exceed a current allowed for battery charging. The output unit 24 may output the DC voltage 220 received from the AC/DC conversion unit 22 to an external port of the third electronic device 100. In addition, the output unit 24 may output the first charging voltage 230-1 or first charging current 230-2 received from the first charging unit 23 to the external port of the third electronic device 100.

Herein, the first charging voltage 230-1 or first charging current 230-2 provided from the first electronic device 20 to the third electronic device 100 may be provided with a delay of a specific time according to a charging start order. For example, when charging starts in an order of the third charging unit 117 of the third electronic device 100 and the first charging unit 23 of the first electronic device 20, until a level of the third charging current 330-2 of the third charging unit 117 of the third electronic device 100 is determined according to a first pre-defined control signal procedure, the output unit 24 of the first electronic device 20 may output the first charging current 230-2 with a delay. Since an output of the DC voltage 220 of the AC/DC conversion unit 22 is provided simultaneously to the first charging unit 23 and the third charging unit 117, in order to provide a voltage and a current reliably according to a constant voltage, current capacity, etc., of the AC/DC conversion unit 22, the first electronic device 20 may provide the voltage and the current sequentially to the third electronic device with a delay of a specific time.

In another exemplary embodiment, in an order of the first charging unit 23 of the first electronic device 20 and the third charging unit 117 of the third electronic device 100, until a level of the first charging current 230-2 of the first charging unit 23 of the first electronic device 20 is determined according to a first pre-defined control signal procedure, the third charging unit 117 of the third electronic device 100 may delay the output of the third charging current 330-2 in order to provide a voltage and a current reliably according to a static voltage, current capacity, etc., of the AC/DC conversion unit 22. In this case, the third charging current 330-2 of the charging unit 117 of the third electronic device 100 may be provided to the battery 111 with a delay of a specific time.

The third charging unit 117, or simply the third charger, of the third electronic device 100 may receive the DC voltage 220 from the output unit 24 of the first electronic device 20. The third charging unit 117 of the third electronic device 100 may generate a third charging voltage 330-1 and third charging current 330-2 required for battery charging using the DC voltage 220. The third charging unit 117 of the third electronic device 100 may provide the third charging voltage 330-1 or the third charging current 330-2 to the battery 111. Meanwhile, the third electronic device 100 may provide the first charging voltage 230-1 or first charging current 230-2 received through an external port to the battery 111.

In various exemplary embodiments, the third charging voltage 330-1 or third charging current 330-2 of the third charging unit 117 of the third electronic device 100 and the first charging voltage 230-1 or first charging current 230-2 of the first charging unit 23 of the first electronic device 20 may be added and provided to the battery 111, or the third charging voltage 330-1 or third charging current 330-2 of the third charging unit 117 of the third electronic device 100 and the first charging voltage 230-1 or first charging current 230-2 of the first charging unit 23 of the first electronic device 20 may be provided to the battery 111 through respective additional connection lines.

The battery 111 may be charged by the first charging voltage 230-1 or first charging current 230-2 and the third charging voltage 330-1 or third charging current 330-2 received from the third charging unit 117.

In the first charging unit 23 of the first electronic device 20 and the third charging unit 117 of the third electronic device 100, each of the charging currents 230-2 and 330-2 may be regulated not to exceed a current allowed to charge the battery 111. A sum of the first charging current 230-2 from the first charging unit 23 of the first electronic device 20 and the third charging current 330-2 from the third charging unit 117 of the third electronic device 100 may not exceed a maximum current allowed to charge the battery 111.

Meanwhile, the first charging unit 23 of the first electronic device 20 may set a time delay regarding a start of a charging operation, and the third charging unit 117 of the third electronic device 100 may perform a reliable charging operation with the pre-set third charging current 330-2 earlier than that of the first charging unit 23 of the first electronic device 20. The first charging unit 23 of the first electronic device 20 may perform a reliable charging operation with the pre-set first charging current 230-2, or may perform a reliable charging operation with the maximum first charging current 230-2 by considering a level of the third charging current 330-2 of the third charging unit 117 of the third electronic device 100 within a range of an allowable charging current of the battery 111 or the first electronic device 20. In various exemplary embodiments, the reliable charging operation may be an operation in which a charging current is regulated between the battery and the charging unit in such a manner that the charging unit provides the battery with a possible charging current when the battery requests the charging unit a pre-set charging current level or a maximum charging current level. Herein, the maximum charging current may be a constant voltage, current, or power of the first electronic device (e.g., adapter).

For example, if the constant voltage of the first electronic device is 5V, 2 A, the maximum first charging current 230-2 considering the level of the third charging current 330-2 of the third charging unit 117 of the third electronic device 100 may imply the remaining all or some currents excluding the third charging current 330-2 of the third charging unit 117 from the constant current of the adaptor.

In various exemplary embodiments, the reliable charging operation implies an operation in which the DC current 220-2 is regulated between the charging units 23 and 117 and the first electronic device 20 in such a manner that the first electronic device 20 provides the charging units 23 and 117 with the possible DC voltage 220 when the charging units 23 and 117 request the first electronic device 20 the pre-set charging current level or the maximum charging current level.

In other words, the maximum charging current may be determined by an Automatic Input Current Limit (AICL) function, and the battery may be charged with a pre-set specific current instead of a maximum charging current according to various exemplary embodiments.

The third charging unit 117 of the third electronic device 100 may set a time delay regarding a charging operation, and the first charging unit 23 of the first electronic device 20 may perform a reliable charging operation with the pre-set first charging current 230-2 earlier than that of the third charging unit 117 of the third electronic device 100. The third charging unit 117 of the third electronic device 100 may perform a reliable charging operation with the pre-set third charging current 330-2, or may perform a reliable charging operation with the maximum third charging current 330-2 by considering a level of the first charging current 230-2 of the first charging unit 23 of the first electronic device 20 within a range of an allowable charging current of the battery 111 or the first electronic device 20. Herein, the maximum third charging current 330-2 considering the level of the first charging current 230-2 of the first charging unit 23 of the first electronic device 20 may imply the remaining all or some currents excluding the third charging current 330-2 of the first charging unit 23 from the constant current of the adaptor.

In another exemplary embodiment, the third charging unit 117 of the third electronic device 100 may perform a reliable charging operation with the pre-set third charging current 330-2 earlier than that of the charging unit 23 of the first electronic device 20, and thereafter the first charging unit 23 of the first electronic device 20 may perform a reliable charging operation with the pre-set first charging current 230-2 or may perform a reliable charging operation with the maximum first charging current 230-2 considering the third charging current 330-2 of the third charging unit 117 of the third electronic device 100 within a range of an allowable charging current of the battery 111 or the first electronic device 20. Herein, the maximum first charging current 230-2 considering the third charging current 330-2 of the third charging unit 117 of the third electronic device 100 may imply the remaining all or some currents excluding the third charging current 330-2 of the third charging unit 117 from the constant current of the adaptor.

The third charging unit 117 of the third electronic device 100 and the first charging unit 23 of the first electronic device 20 may end the operation when the voltage and current capacity (battery capacity) of the battery 111 is fully charged.

Although FIG. 3 illustrates only one third charging unit 117 in the third electronic device 100 and only one first charging unit 23 in the first electronic device 20, according to various exemplary embodiments, the third electronic device 100 or the first electronic device 20 may include a plurality of charging units by combining wired charging units and wireless charging units. The plurality of charging units may be constructed by using a linear charger. The plurality of charging units may be constructed by using a switching charger. The plurality of charging units may be constructed by combining the linear charger and the switching charger.

Figure 4:
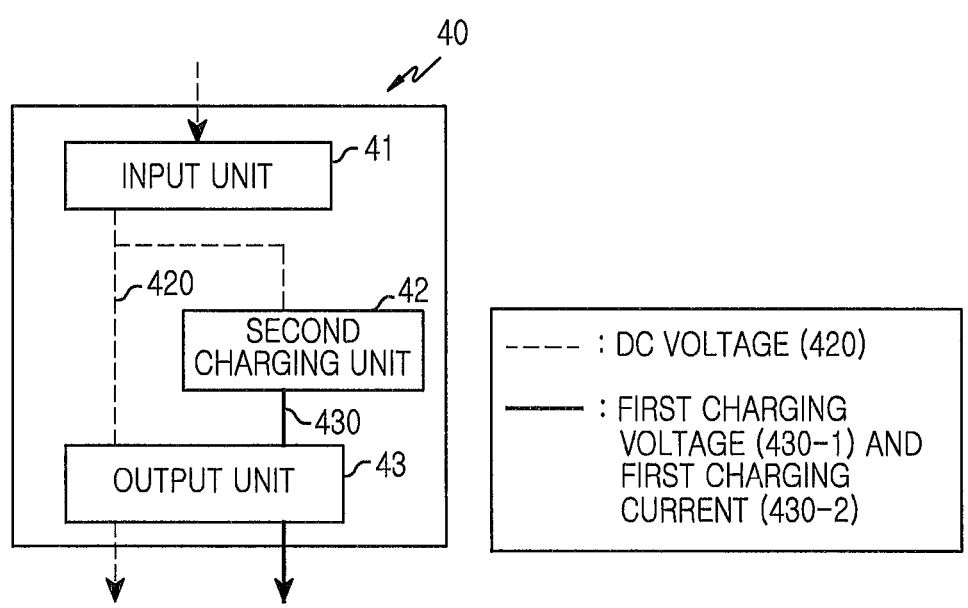
FIG. 4 is a block diagram of a charging dock according to various exemplary embodiments of the present disclosure.

FIG. 4 is a block diagram of a charging dock according to various exemplary embodiments of the present disclosure. A second electronic device 40 may dock the third electronic device 100, and may be electrically connected to the third electronic device 100 and the first electronic device 20.

Referring to FIG. 4, the second electronic device 40 may include an input unit 41, a second charging unit 42, and an output unit 43.

The input unit 41 may include a plug socket. A plug of an external device and the plug socket of the second electronic device 40 may be electrically connected. The input unit 41 may receive a DC voltage 420 from the external device (e.g., the first electronic device 20). The input unit 41 may provide the DC voltage 420 to the second charging unit 42 and the output unit 43.

The second charging unit 42, or simply the second charger, may receive the DC voltage 420 through a connecting part or line with the input unit 41. The second charging unit 42 may generate a first charging voltage 430-1 and first charging current 430-2 capable of charging the battery 111 of the third electronic device 100 from the received DC voltage 420, and may provide the generated first charging voltage 430-1 and first charging current 430-2 to the output unit 43. The second charging unit 42 may regulate a level of the first charging current 430-2 by considering a level of a charging current generated from at least one charging unit included in at least one device (e.g., the electronic device 100) connected to the second electronic device 40. The first charging voltage 430-1 may be a voltage allowed to charge the battery 111.

The output unit 43 may output the DC voltage 420 received through a connecting part or line with the input unit 41. The output unit 43 may output the first charging voltage 430-1 and first charging current 430-2 received through a connecting part or line with the charging unit 42. The output unit 43 may include a male connector (plug) or female connector (socket) electrically connectable to an external port of the third electronic device 100. The output unit 43 may include a male connector (plug) or female connector (socket) electrically connectable to a connector of a cable. The male connector or female connector of the output unit 43 may include a plurality of nodes. Any one of the plurality of nodes may output the DC voltage 420. Any one of the plurality of nodes may output the first charging voltage 430-1 and the first charging current 430-2.

Although FIG. 4 illustrates only one second charging unit 42 in the second electronic device 40, according to various exemplary embodiments, the second electronic device 40 may include a plurality of charging units by combining wired charging units and wireless charging units. In addition, the charging unit herein may be at least one of a linear charging unit and a switching charging unit. If a plurality of charging units are used, the plurality of charging units may be constructed by combining the linear charging unit and the switching charging unit, or may be constructed by combining a plurality of linear charging units and a plurality of switching charging units.

Figure 5:
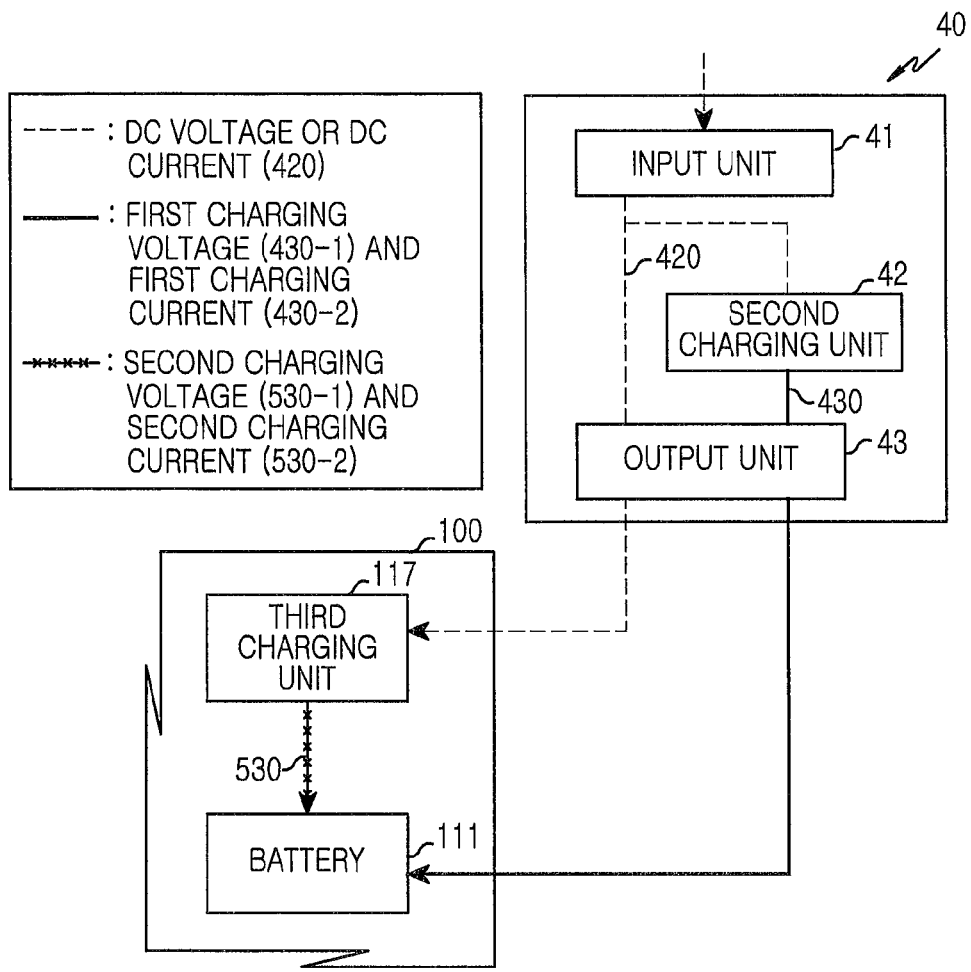
FIG. 5 illustrates a connection between a third electronic device and a second electronic device according to various exemplary embodiments of the present disclosure.

FIG. 5 illustrates a connection between a third electronic device and a second electronic device according to various exemplary embodiments of the present disclosure.

Referring to FIG. 5, a second electronic device 40 may include an input unit 41, a second charging unit 42, and an output unit 43. The input unit 41 may receive a DC voltage 420 from the external device. The input unit 41 may output the DC voltage 420 received through a connecting part or line with the output unit 43. The input unit 41 may output the DC voltage 420 through a connecting part or line with the second charging unit 42. The second charging unit 42 may generate a first charging voltage 430-1 and first charging current 430-2 capable of charging a battery 111 of a third electronic device 100 from the DC voltage 420 received from the input unit 41, and may output the generated first charging voltage 430-1 and first charging current 430-2 through a connecting part or line with the output unit 43. The second charging unit 42 may regulate a level of the first charging current 430-2 by considering a level of a second charging current 530-2 generated from a third charging unit 117 of the third electronic device 100. A sum of the first charging current 430-2 and the second charging current 530-2 may not exceed a current allowed for battery charging. The output unit 43 may output the DC voltage 420 received from the input unit 41 to the external port of the third electronic device 100. In addition, the output unit 43 may output the first charging voltage 430-1 and first charging current 430-2 received from the second charging unit 42 to the external port of the third electronic device 100.

The third charging unit 117 of the third electronic device 100 may receive the DC voltage 420 from the output unit 43 of the second electronic device 40 through the external port. In addition, the external port of the third electronic device 100 may receive the first charging voltage 430-1 and the first charging current 430-2 from the second charging unit 42 of the second electronic device 40.

The third charging unit 117 of the third electronic device 100 may generate the second charging voltage 530-1 and second charging current 530-2 required for battery charging from the DC voltage 420 received through the second electronic device 40. The third charging unit 117 of the third electronic device 100 may output the second charging voltage 530-1 or the second charging current 530-2 through a connecting part or line with the battery 111. The battery 111 may be charged by the second charging voltage 530-1 or second charging current 530-2 received from the third charging unit 117 and the first charging voltage 430-1 and first charging current 430-2 received through the external port of the third electronic device 100.

In various exemplary embodiments, the second charging voltage 530-1 or second charging current 530-2 of the third charging unit 117 of the third electronic device 100 and the first charging voltage 430-1 or first charging current 430-2 of the second charging unit 42 of the second electronic device 40 may be added and provided to the battery 111, or the second charging voltage 530-1 or second charging current 530-2 of the third charging unit 117 of the third electronic device 100 and the first charging voltage 430-1 or first charging current 430-2 of the second charging unit 42 of the second electronic device 40 may be provided to the battery 111 through respective additional connection lines.

The second charging unit 42 of the second electronic device 40 and the third charging unit 117 of the third electronic device 100 may regulate each of the charging currents 430-2 and 530-2 not to exceed a current allowed to charge the battery 111. A sum of the first charging current 430-2 from the second charging unit 42 of the second electronic device 40 and the second charging current 530-2 from the third charging unit 117 of the third electronic device 100 may not exceed the current allowed to charge the battery 111.

Meanwhile, the second charging unit 42 of the second electronic device 40 may perform a time delay regarding a start of a charging operation, and the third charging unit 117 of the third electronic device 100 may perform a reliable charging operation with the pre-set second charging current 530-2 earlier than that of the second charging unit 42 of the second electronic device 40.

The second charging unit 42 of the second electronic device 40 may perform a reliable charging operation with the pre-set first charging current 430-2, or may perform a reliable charging operation with the maximum first charging current 430-2 by considering a level of the second charging current 530-2 of the third charging unit 117 of the third electronic device 100 within a range of an allowable charging current of the battery 111 or the first electronic device 20. Herein, the maximum first charging current 430-2 considering the level of the second charging current 530-2 of the third charging unit 117 of the third electronic device 100 may imply the remaining all or some currents excluding the second charging current 530-2 of the third charging unit 117 from the constant current of the adaptor.

In another exemplary embodiment, the third charging unit 117 of the third electronic device 100 may set a time delay regarding charging, and the second charging unit 42 of the second electronic device 40 may perform a reliable charging operation with the pre-set charging current 430-2 earlier than that of the third charging unit 117 of the third electronic device 100. The third charging unit 117 of the third electronic device 100 performs a reliable charging operation with the pre-set second charging current 530-2, or may perform a reliable charging operation with the maximum second charging current 530-2 by considering a level of the first charging current 430-2 of the second charging unit 42 of the second electronic device 40 within a range of an allowable charging current of the battery 111 or the first electronic device 20. Herein, the maximum second charging current 530-2 considering the first charging current 430-2 of the second charging unit 42 of the second electronic device 40 may imply the remaining all or some currents excluding the first charging current 430-2 of the second charging unit 42 from the constant current of the adaptor.

The third charging unit 117 of the third electronic device 100 and the second charging unit 42 of the second electronic device 40 may end the operation when the voltage and current capacity (battery capacity) of the battery 111 is fully charged.

Although FIG. 5 illustrates only one charging unit 117 in the third electronic device 100 and only one charging unit 42 in the second electronic device 40, according to various exemplary embodiments, the third electronic device 100 or the second electronic device 40 may include a plurality of charging units by combining wired charging units and wireless charging units. The plurality of charging units may be constructed by using a linear charger. The plurality of charging units may be constructed by using a switching charger. The plurality of charging units may be constructed by combining the linear charger and the switching charger.

Figure 6:
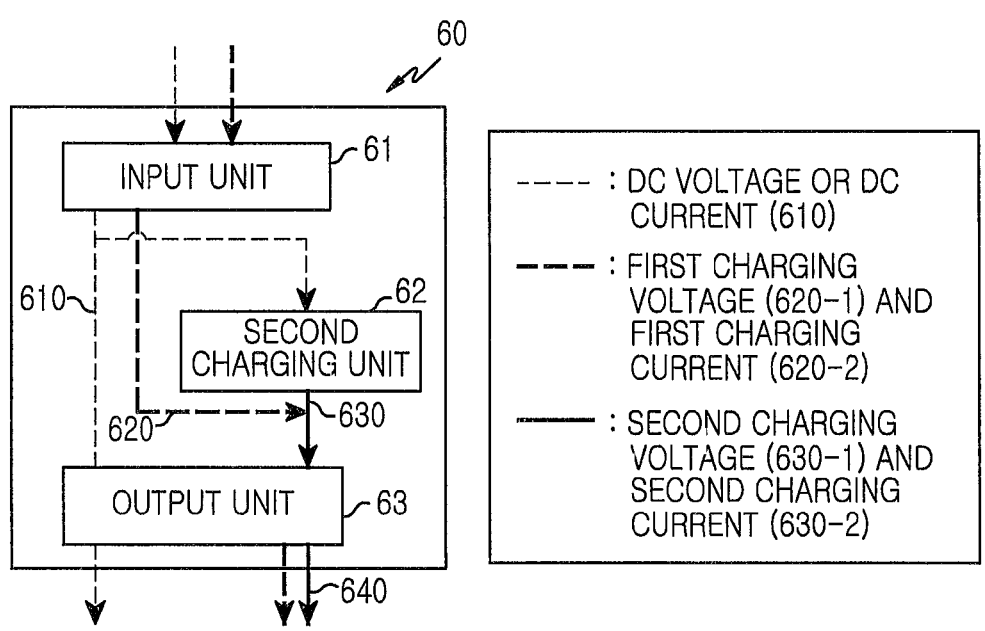
FIG. 6 is a block diagram of a second electronic device according to various exemplary embodiments of the present disclosure.

FIG. 6 is a block diagram of a second electronic device according to various exemplary embodiments of the present disclosure. A dock 60 may be electrically connected to the aforementioned first electronic device 20. The dock 60 may dock the third electronic device 100, and may be electronically connected to the third electronic device 100.

Referring to FIG. 6, the dock 60 may include an input unit 61, a second charging unit 62, and an output unit 63.

The input unit 61 may include a plug socket. A plug of the first electronic device 20 and the plug socket of the dock 60 may be electrically connected. The input unit 61 may receive the DC voltage 220 from the output unit 24 of the first electronic device 20 and the first charging voltage 230-1 and the first charging current 230-2. Herein, the first charging voltage 230-1 and the first charging current 230-2 are a charging voltage and charging current generated by the first charging unit 23 in the first electronic device 20. The input unit 61 may output a DC voltage 610 through a connecting part or line with the output unit 63. The input unit 61 may output the DC voltage 610 through a connecting part or line with a second charging unit 62. In addition, the input unit 61 may provide a first charging voltage 6201 or a first charging current 620-2 through the connecting part or line with the output unit 63.

The second charging unit 62, or simply the second charger, may receive the DC voltage 610 from the input unit 61 through the connecting part or line with the input unit 61. The second charging unit 62 may generate a second charging voltage 630-1 and second charging current 630-2 capable of charging the battery 111 of the third electronic device 100 from the received DC voltage 610, and may output the generated second charging voltage 630-1 and second charging current 630-2 through a connecting part or line with the output unit 63. In various exemplary embodiments, the first charging voltage 620-1 or first charging current 620-2 and the second charging voltage 630-1 or second charging current 630-2 may be added and provided to the output unit 63. Alternatively, the first charging voltage 620-1 or first charging current 620-2 and the second charging voltage 630-1 or second charging current 630-2 may be provided to the output unit 63 through respective additional connection lines.

The second charging unit 62 may regulate a level of the second charging current 630-2 by considering a level of a charging current generated from at least one charging unit included in at least one device (e.g., the third electronic device 100, the first electronic device 20) connected to the dock 60. The second charging voltage 630-1 may be a voltage allowed to charge the battery 111. The second charging unit 62 may output the second charging voltage 630-1 or the second charging current 630-2 through the connecting part or line with the output unit 63.

The output unit 63 may output the DC voltage 610 received through the connecting part or line with the input unit 61. In addition, the output unit 63 may output the first charging voltage 620-1 and first charging current 620-2 received through the input unit 61. In addition, the output unit 63 may output the second charging voltage 630-1 and second charging current 630-2 received through the connecting part or line with the second charging unit 62. The output unit 63 may include a male connector (plug) or a female connector electrically connectable to an external port of the third electronic device 100. The output unit 63 may include a male connector (plug) or female connector electrically connectable to a connector of a cable. The male connector or female connector of the output unit 63 may include a plurality of nodes. Any one of the plurality of nodes may output the DC voltage 220, any one of the plurality of nodes may output the first charging voltage 6204 of the first charging current 620-2, and any one of the plurality of nodes may output the second charging voltage 630-1 or the second charging current 630-2 (see 640). In various exemplary embodiments, the first charging voltage 620-1 or first charging current 620-2 and the second charging voltage 630-1 or second charging current 630-2 may be added and output through any one of the plurality of nodes.

Although FIG. 6 illustrates only one charging unit 62 in the dock 60, according to various exemplary embodiments, the dock 60 may include a plurality of charging units by combining wired charging units and wireless charging units. The plurality of charging units may be constructed by using a linear charger. The plurality of charging units may be constructed by using a switching charger. The plurality of charging units may be constructed by combining the linear charger and the switching charger.

Figure 7:
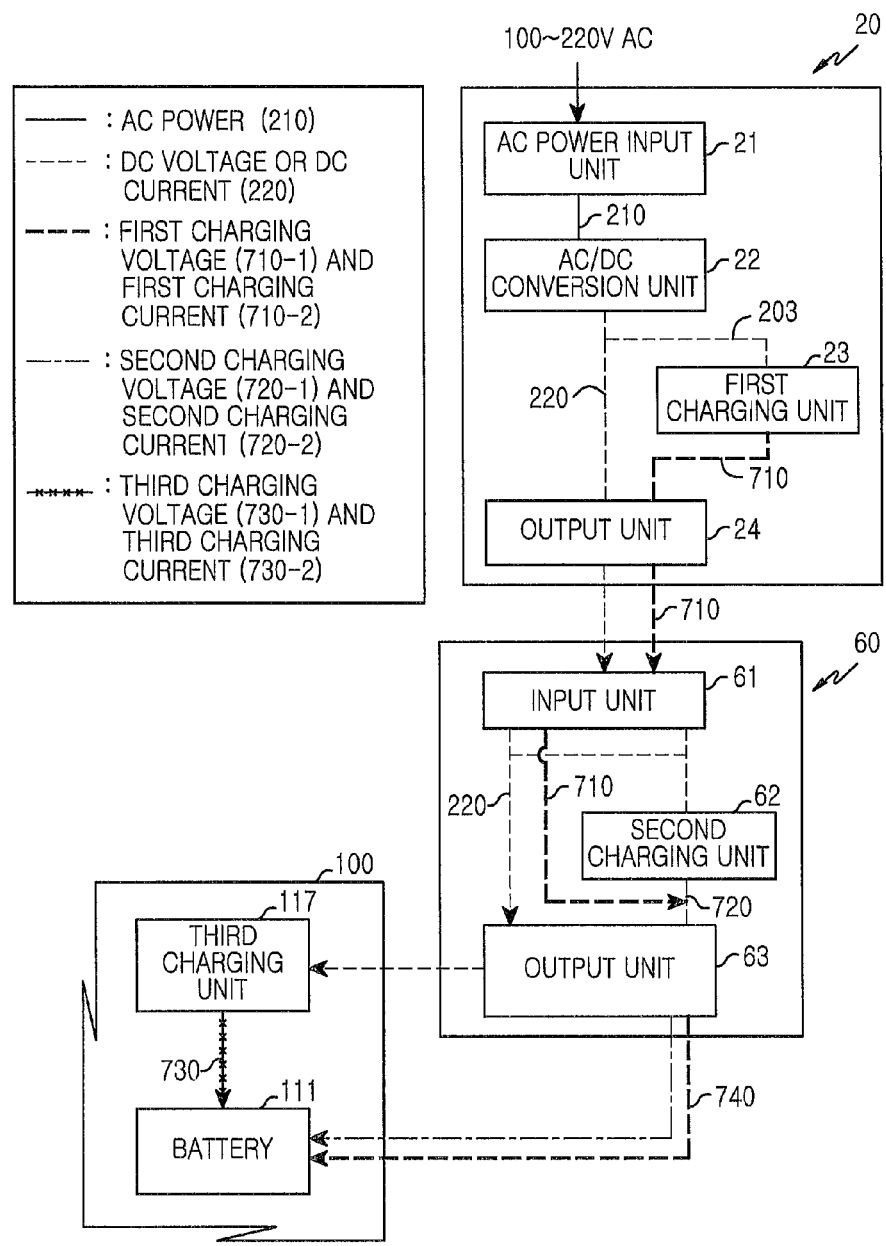
FIG. 7 illustrates a connection of a third electronic device, a second electronic device, and a first electronic device according to various exemplary embodiments of the present disclosure.

FIG. 7 illustrates a connection of a third electronic device, a second electronic device, and a first electronic device according to various exemplary embodiments of the present disclosure.

Referring to FIG. 7, a first electronic device 20 may include an AC power input unit 21, an AC/DC conversion unit 22, a first charging unit 23, and an output unit 24. The AC power input unit 21 may be connected to an AC power source and may receive an AC power 210. The AC power input unit 21 may output the AC power 210 received through a connecting part or line with the AC/DC conversion unit 22. The AC/DC conversion unit 22 may convert the AC power 210 received from the AC power input unit 21 into a DC voltage 220. The AC/DC conversion unit 22 may output the converted DC voltage 220 through a connecting part or line with the output unit 24. The AC/DC conversion unit 22 may output the converted DC voltage 220 through a connecting part or line with the first charging unit 23. The first charging unit 23 may generate a first charging voltage 710-1 and first charging current 710-2 capable of charging a battery 111 of a third electronic device 100 from the DC voltage 220 received from the AC/DC conversion unit 22, and may output the generated first charging voltage 710-1 or first charging current 710-2 through a connecting part or line with the output unit 24. The output unit 24 may output the DC voltage 220 received from the AC/DC conversion unit 22 to an external port of the third electronic device 100. In addition, the output unit 24 may output the first charging voltage 7101 or first charging current 710-2 received from the charging unit 23 to the external port of the third electronic device 100.

A dock 60 may include an input unit 61, a second charging unit 62, and an output unit 63. The input unit 61 may receive the DC voltage 220 from the output unit 24 of the first electronic device 20 and the first charging voltage 7101 or first charging current 710-2. The input unit 61 may output the DC voltage 220 through a connecting part or line with respect to the output unit 63. That is, the dock 60 delivers the DC voltage 220 provided from the first electronic device 20 to the third electronic device 100.

The input unit 61 may output the DC voltage 220 through a connecting part or line with the charging unit 62. The input unit 61 may output the first charging voltage 710-1 and the first charging current 710-2 through the connecting part or line with the output unit 63. The second charging unit 62 may receive the DC voltage 220 from the input unit 61. The second charging unit 62 may generate a second charging voltage 720-1 and second charging current 720-2 capable of charging the battery 111 of the third electronic device 100 from the received DC voltage 220, and may output the generated second charging voltage 720-1 and second charging current 720-2 through a connecting part or line with the output unit 63.

In this case, in various exemplary embodiments, the first charging voltage 710-1 or first charging current 710-2 and the second charging voltage 720-1 or second charging current 720-2 may be added and provided to the output unit 63. Alternatively, the first charging voltage 720-1 or first charging current 720-2 and the second charging voltage 730-1 or second charging current 730-2 may be provided to the output unit 63 through respective additional connection lines.

The second charging unit 62 may output the second charging voltage 720-1 and the second charging current 720-2 through the connecting part or line with the output unit 63. The output unit 63 may output the DC voltage 220 received through the connecting part or line with the input unit 61. In addition, the output unit 63 may output the first charging voltage 710-1 and first charging current 710-2 of the first electronic device 20, received through the connecting part or line with the input unit 61 (see 740). In addition, the output unit 63 may output the second charging voltage 720-1 and second charging current 720-2 received through the connecting part or line with the second charging unit 62. In this case, in various exemplary embodiments, the first charging voltage 710-1 or first charging current 710-2 and the second charging voltage 720-1 or second charging current 720-2 may be added and provided to the third electronic device 100. Alternatively, the first charging voltage 710-1 or first charging current 710-2 and the second charging voltage 720-1 or second charging current 720-2 may be separately provided to the third electronic device 100.

The third charging unit 117 of the third electronic device 100 may receive the DC voltage 220, the first charging voltage 710-1, the first charging current 710-2, the second charging voltage 720-1, and the second charging current 720-2 from the output unit 63 of the dock 60. The third charging unit 117 of the third electronic device 100 may generate a third charging voltage 730-1 and third charging current 730-2 required for battery charging from the DC voltage 220. The third charging unit 117 of the third electronic device 100 may output the first charging voltage 710-1 and the first charging current 710-2 through a connecting part or line with the battery 111. The third charging unit 117 of the third electronic device 100 may output the second charging voltage 720-1 and the second charging current 720-2 through a connecting part or line with the battery 111. The third charging unit 117 of the third electronic device 100 may output the third charging voltage 730-1 and the third charging current 730-2 through a connecting part or line with the battery 111. The battery 111 may be charged by the first charging voltage 710-1, first charging current 710-2, second charging voltage 720-1, second charging current 720-2, third charging voltage 730-1, and third charging current 730-2 received from the charging unit 117.

The first charging voltage 710-1 from the first charging unit 23 of the first electronic device 20, the second charging voltage 720-1 from the second charging unit 62 of the dock 60, and the third charging voltage 730-1 from the third charging unit 117 of the third electronic device 100 may be a voltage allowed to charge the battery 111. The first charging unit 23 of the first electronic device 20, the second charging unit 62 of the dock 60, and the third charging unit 117 of the third electronic device 100 may regulate each of the charging currents 710-2, 720-2, and 730-2 not to exceed a maximum current allowed to charge the battery 111 and the first electronic device 20. A sum of the first charging current 710-2 from the first charging unit 23 of the first electronic device 20, the second charging current 720-2 from the second charging unit 62 of the dock 60, and the third charging current 730-2 from the third charging unit 117 of the third electronic device 100 may not exceed the maximum current allowed to charge the battery 111. In other words, the maximum charging current may be determined by an Automatic Input Current Limit (AICL) function, and the battery may be charged with a pre-set specific current instead of a maximum charging current according to various exemplary embodiments.

At least one of the first charging unit 23 of first electronic device 20, the second charging unit 62 of the dock 60, and the third charging unit 117 of the third electronic device 100 may set a time delay regarding a start of a charging operation. Any one charging unit in which the time delay is set may perform a charging operation later than that of the other charging units. The charging unit which performs the charging operation earlier than that of the other charging units may perform a reliable charging operation with a pre-set charging current.

The first charging unit 23 of the first electronic device 20, the second charging unit 62 of the dock 60, and the third charging unit 117 of the third electronic device 100 may end the operation when the battery 111 is fully charged.

Although FIG. 7 illustrates only one third charging unit 117 in the third electronic device 100, only one first charging unit 23 in the first electronic device 20, and only one second charging unit 62 in the dock 60, according to various exemplary embodiments, the third electronic device 100 or the first electronic device 20 or the second electronic device 40 may include a plurality of charging units by combining wired charging units and wireless charging units. The plurality of charging units may be constructed by using a linear charger. The plurality of charging units may be constructed by using a switching charger. The plurality of charging units may be constructed by combining the linear charger and the switching charger.

Figure 8:
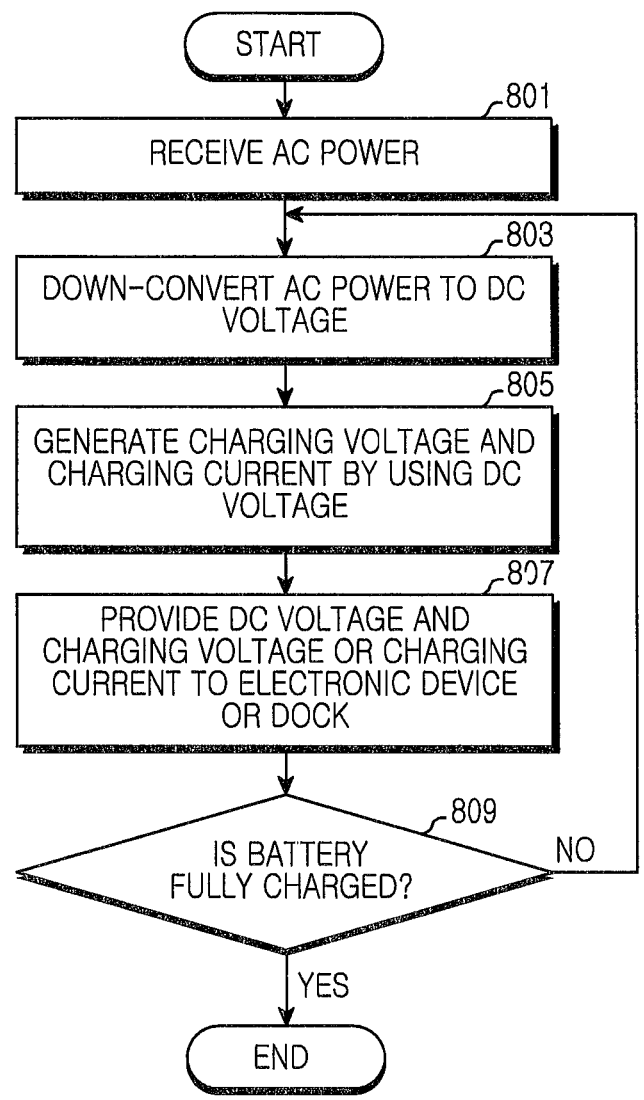
FIG. 8 is a flowchart of a charging process of a first electronic device according to various exemplary embodiments of the present disclosure.

FIG. 8 is a flowchart of a charging process of a first electronic device according to various exemplary embodiments of the present disclosure.

Referring to FIG. 8, in step 801, the input unit 21 of the first electronic device 20 may receive an AC power. In step 803, the AC/DC conversion unit 22 of the first electronic device 20 down-converts the AC power to a DC voltage. In step 805, the first charging unit 23 of the first electronic device 20 may generate a charging voltage and charging current for charging a battery of the electronic device from the DC voltage. In step 807, the output unit 24 of the first electronic device 20 may provide the DC voltage and charging voltage or the charging current to the electronic device or the dock. If the battery of the third electronic device 100 is determined to be fully charged in step 809, the AC/DC conversion unit 22 and first charging unit 23 of the first electronic device 20 may end the operation.

Figure 9:
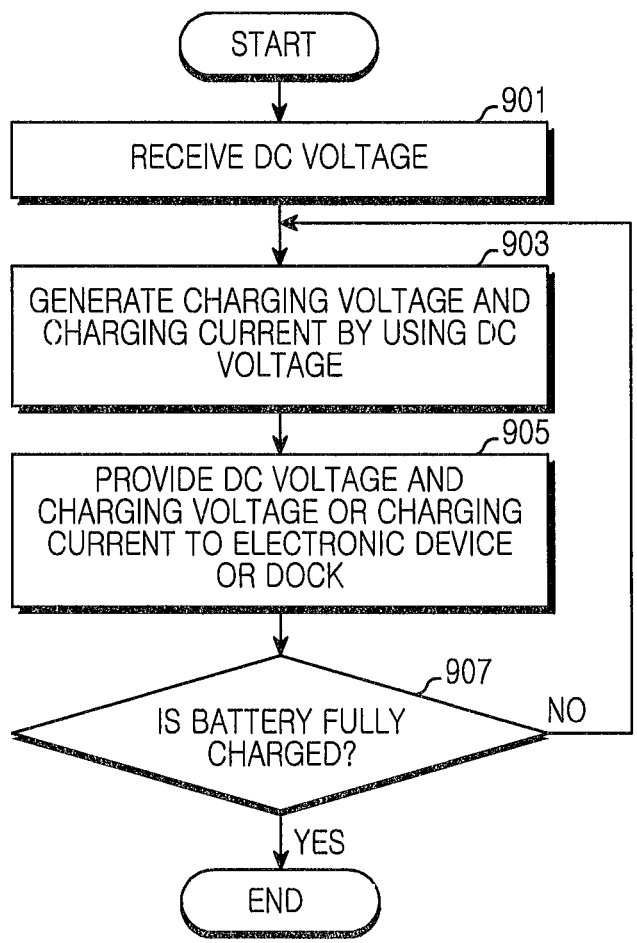
FIG. 9 is a flowchart of a charging process of a second electronic device according to various exemplary embodiments of the present disclosure.

FIG. 9 is a flowchart of a charging process of a second electronic device according to various exemplary embodiments of the present disclosure.

Referring to FIG. 9, in step 901, the input unit 41 of the second electronic device 40 may receive a DC voltage from an external device. In step 903, the second charging unit 42 of the second electronic device 40 may generate a charging voltage and charging current for charging a battery of the electronic device using the DC voltage. In step 905, the output unit 43 of the second electronic device 40 may output the DC voltage, the charging voltage, and the charging current. In step 907, if the battery 111 of the third electronic device 100 is fully charged, the second charging unit 42 of the second electronic device 40 may end the operation.

Figure 10:
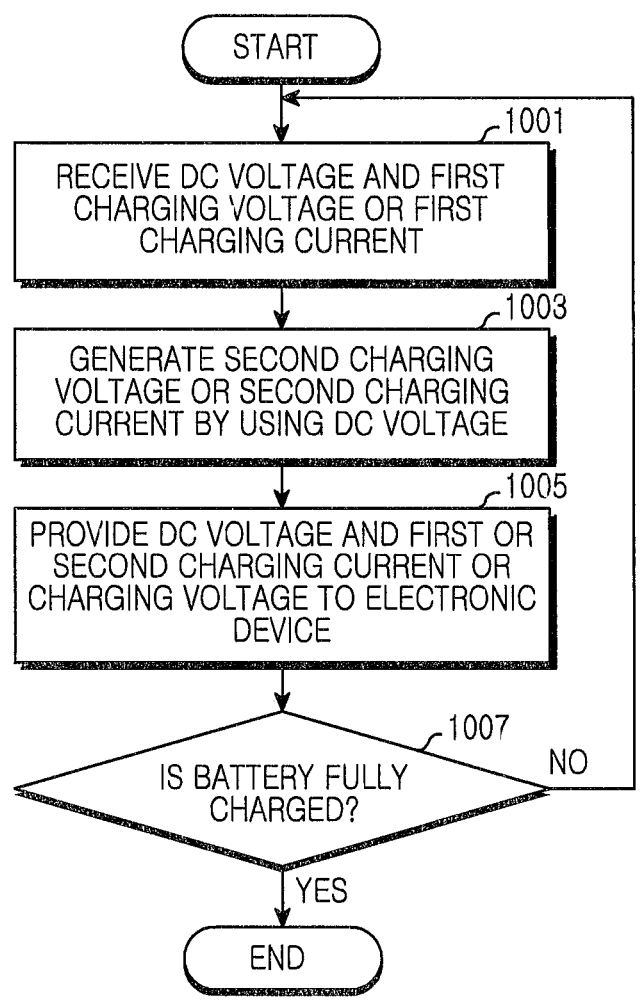
FIG. 10 is a flowchart of a charging process of a second electronic device according to various exemplary embodiments of the present disclosure.

FIG. 10 is a flowchart of a charging process of a second electronic device according to various exemplary embodiments of the present disclosure.

Referring to FIG. 10, in step 1001, the input unit 61 of the dock 60 may receive a DC voltage and a first charging voltage or first charging current from the first electronic device 20. In step 1003, the second charging unit 62 of the dock 60 may generate a second charging voltage and second charging current for charging a battery of the electronic device using the DC voltage. In step 1005, the output unit 63 of the dock 60 may provide the DC voltage received from the first electronic device 20, the first charging voltage or first charging current, and the second charging voltage or second charging current to the electronic device. Herein, the first charging voltage or second charging current is a voltage or current generated by the first electronic device 20, and the second charging voltage or second charging current is a voltage or current generated by the second charging unit 62 in the dock 60.

In various exemplary embodiments, the first charging voltage or first charging current and the second charging voltage or second charging current may be added and provided to the electronic device. Alternatively, the first charging voltage or first charging current and the second charging voltage or second charging current may be separately provided to the electronic device.

In step 1007, if the battery 111 of the third electronic device 100 is fully charged, the second charging unit 62 of the dock 60 may end the operation.

Figure 11:
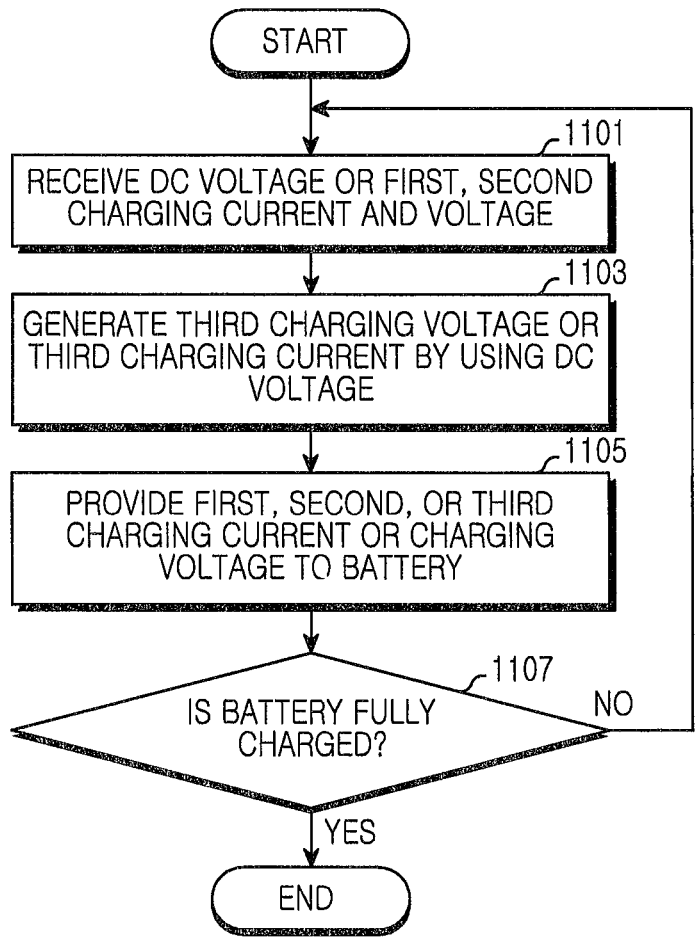
FIG. 11 is a flowchart of a charging process of a third electronic device according various exemplary embodiments of the present disclosure.

FIG. 11 is a flowchart of a charging process of a third electronic device according to various exemplary embodiments of the present disclosure.

Referring to FIG. 11, in step 1101, the third electronic device 100 may receive a DC voltage, first and second charging voltages, and first and second charging currents. Herein, the first charging voltage or first charging current is a voltage or current generated by the first electronic device 20, and the second charging voltage or second charging current is a voltage or current generated by the dock 60. The DC voltage may be generated by the first electronic device 20 and delivered through the dock 60.

In step 1103, the third charging unit 117 of the third electronic device 100 may generate a third charging voltage and third charging current for charging the battery 111 from the DC voltage. In step 1105, the third charging unit 117 of the third electronic device 100 may charge the battery 111 by providing the battery 111 with the first charging voltage or first charging current, the second charging voltage or second charging current, and the third charging voltage or third charging current. In step 1107, if the battery 111 is completely charged, the charging unit 117 of the third electronic device 100 may end the operation.

Figure 12:
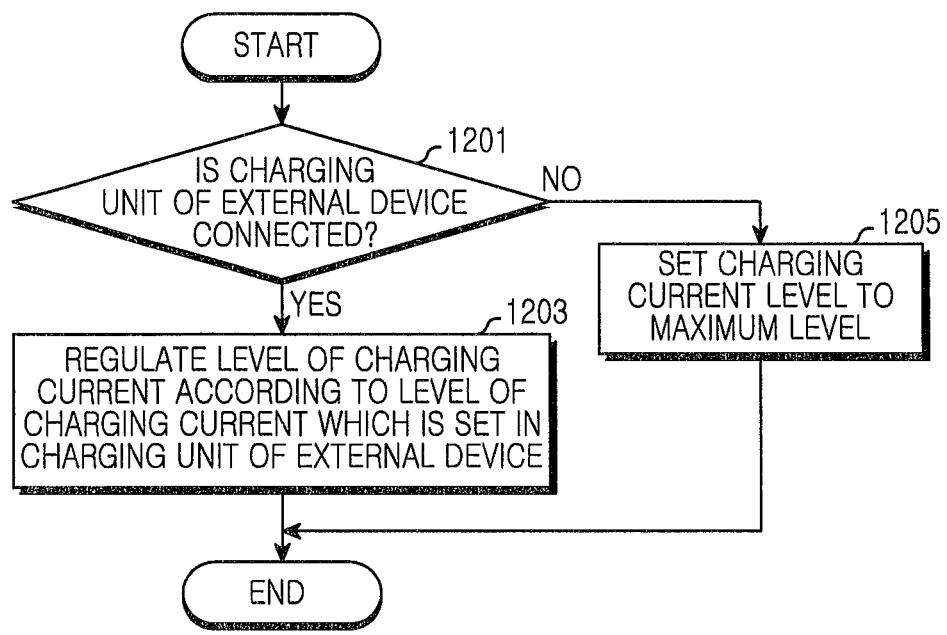
FIG. 12 is a flowchart of a process of setting a charging current of an adapter according to various exemplary embodiments of the present disclosure.

FIG. 12 is a flowchart of a process of setting a charging current of an adapter according to various exemplary embodiments of the present disclosure.

In step 1201, the charging unit 23 of the first electronic device 20 may confirm whether a charging unit of an external device (e.g., the electronic device 100 and/or the dock 40) is connected. If the charging unit of the external device is connected, in step 1203, the first charging unit 23 of the first electronic device 20 may regulate a level of a charging current in response to a level of the charging current which is set in the charging unit of the external device. Otherwise, if the charging unit of the external device is not connected, in step 1205, the first charging unit 23 of the first electronic device 20 may set the level of the charging current to a maximum level. The operations of FIG. 12 are also applicable to the dock 60 or the third electronic device 100.

Figure 13:
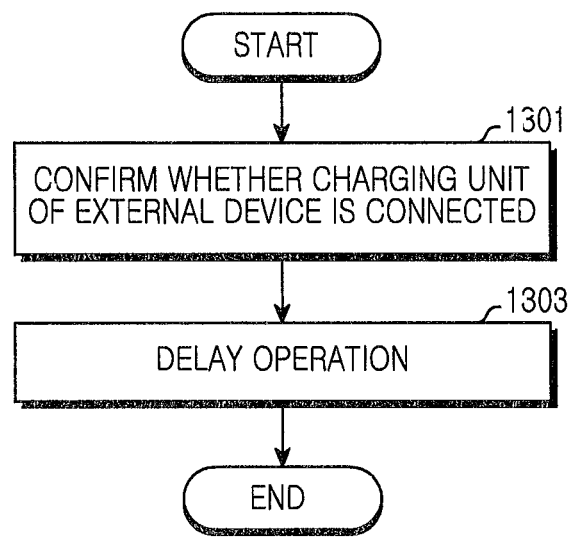
FIG. 13 is a flowchart of a process of starting an operation of a charging unit of a first electronic device according to various exemplary embodiments of the present disclosure.

FIG. 13 is a flowchart of a process of starting an operation of a charging unit of a first electronic device according to various exemplary embodiments of the present disclosure.

Referring to FIG. 13, in step 1301, the charging unit 23 of the first electronic device 20 may confirm whether a charging unit of an external device (e.g., the electronic device 100, the dock 60) is connected. If the charging unit of the external device is connected, in step 1303, the first charging unit 23 of the first electronic device 20 may delay the operation. The operations of FIG. 13 are also applicable to the dock 60 or the third electronic device 100.

FIG. 14 is a table illustrating an operation order of charging units in a state where a third electronic device, a first electronic device, and a second electronic device are connected according to various exemplary embodiments of the present disclosure.

At least one of the charging unit 117 of the third electronic device 100, the first charging unit 23 of the first electronic device 20, and the second charging unit 62 of the dock 60 may set a time delay regarding the operation. For example, if the third electronic device 100 and the first electronic device 20 are connected, the third charging unit 117 of the third electronic device 100 may perform a reliable operation (charging) for outputting a pre-set charging current earlier than that of the first charging unit 23 of the first electronic device 20, and the first charging unit 23 of the first electronic device 20 may operate after the time delay. The first charging unit 23 of the first electronic device 20 may regulate a level of a charging current by considering a level of the charging current which is set in the third charging unit 117 of the third electronic device 100. A sum of the charging current output from the third charging unit 117 of the third electronic device 100 and the charging current output from the first charging unit 23 of the first electronic device 20 may not exceed an allowable charging current of the battery 111.

An electronic device is connected to at least one external device (e.g., an adapter, a dock, etc.) having a charging unit, and a battery of the electronic device is charged not only by an internal charging unit of the electronic device but also by a charging unit of at least one external device, thereby being able to decrease a charging time of the battery. Since a charging current conforming to an allowable charging current of a high capacity battery of the electronic device is processed in a distributed manner in a charging unit of the electronic device and a charging unit of at least one external device, a heat generated during charging is processed in a distributed manner, thereby being able to decrease a charging time while decreasing heating of the electronic device.

In accordance with first implementations of the present disclosure, an electronic device 20 includes a conversion unit 22 configured to convert an Alternating Current (AC) voltage to a Direct Current (DC) voltage; a first charging unit 23 configured to generate a first charging voltage or current using the DC voltage; and an output unit 24 to provide the DC voltage and the first charging voltage or current to an external device, such as the second electronic device 60 or the third electronic device 100.

In accordance with first implementations of the present disclosure, the electronic device 20 further includes a first connecting part to deliver the DC voltage to the output unit 24 and the first charging unit 23; and a second connecting part to deliver the first charging voltage or current to the output unit 24.

In accordance with first implementations of the present disclosure, the first charging unit 23 is configured to regulate a level related to the first charging voltage or current based at least in part on a level related to a second charging voltage or current output from a second charging unit included inside the external device, such as the second electronic device 60 or the third electronic device 100.

In accordance with first implementations of the present disclosure, a sum of the second charging current output from the external device, such as the third electronic device 100 or a dock 60, and the first charging current output from the output unit does not exceed an allowable charging current related to a battery, such as battery 111 of the third electronic device 100.

In accordance with first implementations of the present disclosure, the first charging current comprises a charging current having a specified level or a maximum charging current that may be allowed within a range of an allowable charging current related to the electronic device 20.

In accordance with first implementations of the present disclosure, the first charging unit 23 is configured to charge the battery, such as battery 111 of the third electronic device 100, using the first charging current without a specified time delay when the first charging current is the charging current having the specified level, and to charge the battery using the first charging current after the specified time delay when the first charging current is the maximum charging current that may be allowed within the range of the permitted charging current related to the electronic device 20.

In accordance with first implementations of the present disclosure, the external device is either electrically coupled directly to the electronic device 20 or capable of docking another electronic device, such as the third electronic device 100 and electrically coupling the electronic device and the other electronic device.

In accordance with second implementations of the present disclosure, a second electronic device 60 to electrically couple between a first electronic device 20 having a charging function and a third electronic device 100 having a charging function is provided. The second electronic device 60 includes an input unit 61 configured to receive a Direct Current voltage and a first charging voltage or current from the first electronic device 20; a second charging unit 62 configured to generate a second charging voltage or current to charge a battery using the DC voltage; and an output unit 63 to provide the DC voltage, and at least one of the first charging voltage or current and the second charging voltage or current to the third electronic device 100.

In accordance with second implementations of the present disclosure, the second electronic device 60 further includes a first connecting part to deliver the DC voltage to the output unit 63 and the second charging unit 62; and a second connecting part to deliver the first charging voltage or current and the second charging voltage or current to the output unit 63. The first charging voltage or current is a charging voltage or current provided from the first charging unit 23 included inside the first electronic device 20.

In accordance with second implementations of the present disclosure, the second charging unit 62 is configured to regulate a level related to the second charging voltage or current based at least in part on a level related to the first charging voltage current from a first charging unit 23 included inside the first electronic device 20 and a third charging voltage or current from a third charging unit 117 included inside the third electronic device 100.

In accordance with second implementations of the present disclosure, a sum of the first charging current output from the first electronic device 20, the third charging current output from the third electronic device 100, and the second charging current output from the second electronic device 60 does not exceed an allowable charging current of a battery, such as battery 111 of the third electronic device 100.

In accordance with second implementations of the present disclosure, the first charging current or the second charging current comprises a charging current having a specified level or a maximum charging current that may be allowed within a range of an allowable charging current related to the first electronic device 20.

In accordance with second implementations of the present disclosure, the second charging unit 62 is configured to charge the battery 111 using the second charging current without a specified time delay when the second charging current is the charging current having the specified level, and to charge the battery 111 using the second charging current after the specified time delay when the second charging current is the maximum charging current that may be allowed within the range of the permitted charging current related to the first electronic device 20.

In accordance with second implementations of the present disclosure, the battery 111 is inserted inside the third electronic device 100 and is used as a power source of the third electronic device 100.

In accordance with third implementations of the present disclosure, a third electronic device 100 includes an input unit configured to receive at least one of a DC power and a first charging voltage or current from a first electronic device 20, and a DC power and a second charging voltage or current from a second electronic device 60; at least one third charging unit 117, or simply at least one third charger, configured to generate at least one third charging voltage or current for charging an internal battery 111 using the DC voltage; and a battery 111 configured to be charged by the at least one of the first charging voltage or current, the second charging voltage or current, and the at least one third charging voltage or current.

In accordance with third implementations of the present disclosure, the first electronic device 20 is an adapter, and the second electronic device 60 is a dock for docking the third electronic device 100.

In accordance with third implementations of the present disclosure, a level related to the at least one third charging voltage or current is regulated based at least in part on the first charging voltage or current and the second charging voltage or current.

In accordance with third implementations of the present disclosure, a sum of the at least one of the first charging current and the second charging current, and the at least one third charging current does not exceed an allowable charging current related to the battery 111.

In accordance with third implementations of the present disclosure, wherein the first, second, or third charging current comprises a charging current having a specified level or a maximum charging current that may be allowed within a range of an allowable charging current related to the first electronic device 20.

In accordance with third implementations of the present disclosure, the at least one third charging unit 117 is configured to charge the battery 111 using the at least one third charging current without a specified time delay when the at least one third charging current is the charging current having the specified level, and to charge the battery 111 using the at least one third charging current after the specific time delay when the at least one third charging current is the maximum charging current that may be allowed within the range of the permitted charging current related to the first electronic device 20.

In accordance with fourth implementations of the present disclosure, a method of operating an electronic device 20 having a charging function is provided. The method includes converting an Alternating Current (AC) voltage to a Direct Current (DC) voltage (step 803); generating a first charging voltage or current using the DC voltage (step 805); and providing the DC voltage and the first charging voltage or current to an external device, such as the second electronic device 60 or the third electronic device 100 (step 807).

In accordance with fourth implementations of the present disclosure, the method further includes regulating a level related to the first charging voltage or current based at least in part on a level related to a second charging voltage or current from a second charging unit included inside the external device, such as the second electronic device 60 or the third electronic device 100.

In accordance with fourth implementations of the present disclosure, a sum of the second charging current from the external device, such as the third electronic device 100 or a dock 60, and the first charging current from the electronic device does not exceed an allowable charging current related to a battery, such as the battery 111 of the third electronic device 100.

In accordance with fourth implementations of the present disclosure, the first charging current comprises a charging current having a specified level or a maximum charging current that may be allowed within a range of an allowable charging current related to the electronic device 20.

In accordance with fourth implementations of the present disclosure, the method further includes charging the battery 111 using the first charging current without a specified time delay when the first charging current is the charging current having the specified level, and charging the battery 111 using the first charging current after the specific time delay when the first charging current is the maximum charging current that may be allowed within the range of the permitted charging current related to the electronic device 20.

In accordance with fourth implementations of the present disclosure, the external device is either electrically coupled directly to the electronic device 20 or capable of docking another electronic device and electrically coupling the electronic device and the other electronic device.

In accordance with fifth implementations of the present disclosure, a method of operating a second electronic device 60 to electrically couple between a first electronic device 20 having a charging function and a third electronic device 100 having a charging function is provided. The method includes receiving a Direct Current (DC) voltage and a first charging voltage or current from the first electronic device 20 (step 1001); generating a second charging voltage or current to change a battery using the DC voltage (step 1003); and providing the DC voltage, and at least one of the first charging voltage or current and the second charging voltage or current to the third electronic device 100 (step 1005).

In accordance with fifth implementations of the present disclosure, the first charging voltage or current is a charging voltage or current provided from a first charging unit included inside the first electronic device 20, and the second charging voltage or second charging current is a charging voltage or current provided from a second charging unit of the second electronic device 60.

In accordance with fifth implementations of the present disclosure, the method further includes regulating a level related to the second charging voltage or current based at least in part on a level related to the first charging voltage or current from the first electronic device 20 and a third charging voltage or current from the third electronic device 100.

In accordance with fifth implementations of the present disclosure, a sum of the first charging current, the third charging current, and the second charging current does not exceed an allowable charging current of a battery, such as battery 111 of the third electronic device 100.

In accordance with fifth implementations of the present disclosure, the first charging current or the second charging current comprises a charging current having a specified level or a maximum charging current that may be allowed within a range of an allowable charging current related to the first electronic device 20.

In accordance with fifth implementations of the present disclosure, the method further includes charging the battery 111 using the second charging current without a specified time delay when the second charging current is the charging current having the specified level, and charging the battery using the second charging current after the specified time delay when the second charging current is the maximum charging current that may be allowed within the range of the permitted charging current related to the first electronic device 20.

In accordance with fifth implementations of the present disclosure, the battery 111 is inserted inside the third electronic device 100 and is used as a power source of the third electronic device 100.

In accordance with sixth implementations of the present disclosure, a method of operating a third electronic device 100 having a charging function is provided. The method includes receiving at least one of a DC power and a first charging voltage or current from a first electronic device, and a DC power and a second charging voltage or current from a second electronic device (step 1101); generating at least one third charging voltage or current for charging an internal battery using the DC voltage (step 1103); and charging a battery 111 using the first charging voltage or current, the second charging voltage or current, and the at least one third charging voltage or current (step 1105).

In accordance with sixth implementations of the present disclosure, the first electronic device 20 is an adapter, and the second electronic device 60 is a dock for docking the third electronic device 100.

In accordance with sixth implementations of the present disclosure, the method further includes regulating a level related to the at least one third charging voltage or current based at least in part on a level related to the first charging voltage or current and the second charging voltage or current.

In accordance with sixth implementations of the present disclosure, a sum of the at least one of the first and the second charging current, and the at least one third charging current does not exceed an allowable charging current related to the battery 111.

In accordance with sixth implementations of the present disclosure, the first, second, or third charging current comprises a charging current having a specified level or a maximum charging current that may be allowed within a range of an allowable charging current related to the first electronic device 20. The method further includes charging the battery 111 using the at least one third charging current without a specified time delay when the at least one third charging current is the charging current having the specified level, and charging the battery using the at least one third charging current after the specified time delay when the at least one third charging current is the maximum charging current that may be allowed within the range of the permitted charging current related to the first electronic device 20.

In accordance with seventh implementations of the present disclosure, an electronic device includes a battery configured to supply a first DC voltage or current; a conversion unit configured to convert the first DC voltage or current to a second DC voltage or current; a first charging unit configured to generate a first charging voltage or current using the second DC voltage or current; and an output unit to provide the second DC voltage or current and the first DC voltage or current.

In accordance with seventh implementations of the present disclosure, the electronic device includes a first connecting part, to deliver the second DC voltage or current to the output unit and the first charging unit; and a second connecting part, to deliver the first charging voltage or the current to the output unit.

In accordance with seventh implementations of the present disclosure, the first charging unit is configured to regulate a level related to the first charging voltage or current based, at least in part on a level related to at least one second charging voltage or current from a second charging unit included inside an least one external device.

In accordance with seventh implementations of the present disclosure, a sum of the first charging current and the at least one second charging current does not exceed an allowable charging current of the battery.

In accordance with seventh implementations of the present disclosure, the first charging current comprises a charging current having a specified level or a maximum charging current that may be allowed within a range of an allowable charging current related to the electronic device.

In accordance with seventh implementations of the present disclosure, the first charging unit is configured to charge the battery using the first charging current with a specified time delay when the first charging current is the charging current having the specified level, and to charge the battery using the first charging current after the specified time delay when the first charging current is the maximum charging current that may be allowed within the range of the permitted charging current in the relation with the electronic device.

In accordance with seventh implementations of the present disclosure, the external device is either electrically coupled directly to the electronic device or capable of docking another electronic device and electrically coupling the electronic device and the other electronic device.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. An electronic device comprising:
a conversion unit configured to convert an Alternating Current (AC) voltage to a Direct Current (DC) voltage;
a first charging unit configured to generate a first charging voltage or current using the DC voltage; and
an output unit to provide the DC voltage and the first charging voltage or current to an external device,
wherein the first charging unit is configured to regulate a level related to the first charging voltage or current based at least in part on a level related to a second charging voltage or current output from a second charging unit included inside the external device.

2. The electronic device of claim 1, further comprising:
a first connecting part to deliver the DC voltage to the output unit and the first charging unit; and
a second connecting part to deliver the first charging voltage or current to the output unit.

3. The electronic device of claim 1, wherein a sum of the second charging current output from the external device and the first charging current output from the output unit does not exceed an allowable charging current related to a battery.

4. The electronic device of claim 3, wherein the first charging current comprises:
a charging current having a specified level or a maximum charging current that can be allowed within a range of an allowable charging current related to the electronic device.

5. The electronic device of claim 4, wherein the first charging unit is configured to:
charge the battery using the first charging current without a specified time delay when the first charging current is the charging current having the specified level, and
charge the battery using the first charging current after the specified time delay when the first charging current is the maximum charging current that can be allowed within the range of the allowable charging current related to the electronic device.

6. The electronic device of claim 1, wherein the external device is either electrically coupled directly to the electronic device or capable of docking another electronic device and electrically coupling the electronic device and the other electronic device.

7. A second electronic device to electrically couple between a first electronic device having a charging function and a third electronic device having a charging function, the second electronic device comprising:
   an input unit configured to receive a Direct Current (DC) voltage and a first charging voltage or current from the first electronic device;
   a second charging unit configured to generate a second charging voltage or current to charge a battery using the DC voltage; and
   an output unit to provide the DC voltage, and at least one of the first charging voltage or current and the second charging voltage or current to the third electronic device.

8. The second electronic device of claim 7, further comprising:
   a first connecting part to deliver the DC voltage to the output unit and the second charging unit; and
   a second connecting part to deliver the first charging voltage or current and the second charging voltage or current to the output unit,
   wherein the first charging voltage or current is a charging voltage or current provided from a first charging unit included inside the first electronic device.

9. The second electronic device of claim 7, wherein the second charging unit is configured to:
   regulate a level related to the second charging voltage or current based at least in part on a level related to the first charging voltage or current from a first charging unit included inside the first electronic device and a third charging voltage or current from a third charging unit included inside the third electronic device.

10. The second electronic device of claim 9, wherein a sum of the first charging current output from the first electronic device, the third charging current output from the third electronic device, and the second charging current output from the second electronic device does not exceed an allowable charging current of a battery.

11. The second electronic device of claim 10, wherein the first charging current or the second charging current comprises:
   a charging current having a specified level or a maximum charging current that can be allowed within a range of an allowable charging current related to the first electronic device.

12. The second electronic device of claim 11, wherein the second charging unit is configured to:
   charge the battery using the second charging current without a specified time delay when the second charging current is the charging current having the specified level, and
   charge the battery using the second charging current after the specified time delay when the second charging current is the maximum charging current that can be allowed within the range of the allowable charging current related to the first electronic device.

13. The second electronic device of claim 10, wherein the battery is inserted inside the third electronic device and is used as a power source of the third electronic device.

14. A third electronic device comprising:
   an input unit configured to receive at least one of:
      a Direct Current (DC) voltage and a first charging voltage or current from a first electronic device, and
      a DC voltage and a second charging voltage or current from a second electronic device;
   at least one third charging unit configured to generate at least one third charging voltage or current for charging an internal battery using the received at least one DC voltage; and
   a battery configured to be charged by the at least one of the first charging voltage or current, the second charging voltage or current, and the at least one third charging voltage or current,
   wherein a level related to the at least one third charging voltage or current is regulated based at least in part on the first charging voltage or current and the second charging voltage or current.

15. The third electronic device of claim 14, wherein the first electronic device is an adapter, and the second electronic device is a dock for docking the third electronic device.

16. The third electronic device of claim 14, wherein a sum of the at least one of the first charging current and the second charging current, and the at least one third charging current does not exceed an allowable charging current related to the battery.

17. The third electronic device of claim 16, wherein the first charging current, the second charging current, or the third charging current comprises:
   a charging current having a specified level or a maximum charging current that can be allowed within a range of an allowable charging current related to the first electronic device.

18. The third electronic device of claim 17, wherein the at least one third charging unit is configured to:
   charge the battery using the at least one third charging current without a specified time delay when the at least one third charging current is the charging current having the specified level, and
   charge the battery using the at least one third charging current after the specific time delay when the at least one third charging current is the maximum charging current that can be allowed within the range of the allowable charging current related to the first electronic device.

19. A method of operating an electronic device having a charging function, the method comprising:
   converting an Alternating Current (AC) voltage to a Direct Current (DC) voltage;
   generating a first charging voltage or current using the DC voltage;
   providing the DC voltage and the first charging voltage or current to an external device; and
   regulating a level related to the first charging voltage or current based at least in part on a level related to a second charging voltage or current from a second charging unit included inside the external device.

20. The method of claim 19, wherein a sum of the second charging current from the external device and the first charging current from the electronic device does not exceed an allowable charging current related to a battery.

21. The method of claim 20, wherein the first charging current comprises:
   a charging current having a specified level or a maximum charging current that can be allowed within a range of an allowable charging current related to the electronic device.

22. The method of claim 21, wherein further comprising:
   charging the battery using the first charging current without a specified time delay when the first charging current is the charging current having the specified level, and charging the battery using the first charging current after the specific time delay when the first charging current is the maximum charging current that can be allowed within the range of the allowable charging current related to the electronic device.

23. The method of claim 19, wherein the external device is either electrically coupled directly to the electronic device or capable of docking another electronic device and electrically coupling the electronic device and the other electronic device.

24. A method of operating a second electronic device to electrically couple between a first electronic device having a charging function and a third electronic device having a charging function, the method comprising:
receiving a Direct Current (DC) voltage and a first charging voltage or current from the first electronic device;
generating a second charging voltage or current to charge a battery using the DC voltage; and
providing the DC voltage, and at least one of the first charging voltage or current and the second charging voltage or current to the third electronic device.

25. The method of claim 24, wherein:
the first charging voltage or current is a charging voltage or current provided from a first charging unit included inside the first electronic device, and
the second charging voltage or current is a charging voltage or current provided from a second charging unit of the second electronic device.

26. The method of claim 24, further comprising regulating a level related to the second charging voltage or current based at least in part on a level related to the first charging voltage or current from the first electronic device and a third charging voltage or current from the third electronic device.

27. The method of claim 26, wherein a sum of the first charging current, the third charging current, and the second charging current does not exceed an allowable charging current of a battery.

28. The method of claim 27, wherein the first charging current or the second charging current comprises:
a charging current having a specified level or a maximum charging current that can be allowed within a range of an allowable charging current related to the first electronic device.

29. The method of claim 28, further comprising:
charging the battery using the second charging current without a specified time delay when the second charging current is the charging current having the specified level, and
charging the battery using the second charging current after the specified time delay when the second charging current is the maximum charging current that can be allowed within the range of the allowable charging current related to the first electronic device.

30. The method of claim 27, wherein the battery is inserted inside the third electronic device and is used as a power source of the third electronic device.

31. A method of operating a third electronic device having a charging function, the method comprising:
receiving at least one of i) a Direct Current (DC) voltage and a first charging voltage or current from a first electronic device, and ii) a Direct Current voltage and a second charging voltage or current from a second electronic device;
generating at least one third charging voltage or current for charging an internal battery using the received at least one DC voltage;
charging a battery using the first charging voltage or current, the second charging voltage or current, and the at least one third charging voltage or current; and
regulating a level related to the at least one third charging voltage or current based at least in part on a level related to the first charging voltage or current and the second charging voltage or current.

32. The method of claim 31, wherein the first electronic device is an adapter, and the second electronic device is a dock for docking the third electronic device.

33. The method of claim 31, wherein a sum of the at least one of the first charging current and the second charging current, and the at least one third charging current does not exceed an allowable charging current related to the battery.

34. The method of claim 31, wherein the first charging current, the second charging current, or the third charging current comprises a charging current having a specified level or a maximum charging current that can be allowed within a range of an allowable charging current related to the first electronic device,
wherein the method further comprises:
charging the battery using the at least one third charging current without a specified time delay when the at least one third charging current is the charging current having the specified level, and
charging the battery using the at least one third charging current after the specified time delay when the at least one third charging current is the maximum charging current that can be allowed within the range of the allowable charging current related to the first electronic device.

35. An electronic device comprising:
a battery configured to supply a first direct current (DC) voltage or current;
a conversion unit configured to convert the first DC voltage or current to a second DC voltage or current;
a first charging unit configured to generate a first charging voltage or current using the second DC voltage or current; and
an output unit to provide the second DC voltage or current and the first DC voltage or current to an external device.

36. The electronic device of claim 35, further comprising:
a first connecting part to deliver the second DC voltage or current to the output unit and the first charging unit; and
a second connecting part to deliver the first charging voltage or current to the output unit.

37. The electronic device of claim 35, wherein the first charging unit is configured to:
regulate a level related to the first charging voltage or current based at least in part on a level related to at least one second charging voltage or current from a second charging unit included inside the external device.

38. The electronic device of claim 37, wherein a sum of the first charging current and the at least one second charging current does not exceed an allowable charging current of the battery.

39. The electronic device of claim 35, wherein the first charging current comprises a charging current having a specified level or a maximum charging current that can be allowed within a range of an allowable charging current related to the electronic device.

40. The electronic device of claim 39, wherein the first charging unit is configured to:
charge the battery using the first charging current with a specified time delay when the first charging current is the charging current having the specified level, and charge the battery using the first charging current after the specified time delay when the first charging current is the maximum charging current that can be allowed within the range of the allowable charging current related to the electronic device.

41. The electronic device of claim 35, wherein the external device is either electrically coupled directly to the electronic device or capable of docking another electronic device and electrically coupling the electronic device and the other electronic device.

* * * * *